(12) United States Patent
Sugita et al.

(10) Patent No.: US 11,933,682 B2
(45) Date of Patent: Mar. 19, 2024

(54) PRESSURE SENSITIVE SENSOR WITH CONDUCTING MEMBERS AND AN INSULATING MEMBER

(71) Applicant: PROTERIAL, LTD., Tokyo (JP)

(72) Inventors: Keisuke Sugita, Tokyo (JP); Kentaro Abe, Tokyo (JP); Tomomi Onose, Tokyo (JP); Taichi Oka, Tokyo (JP); Manabu Kako, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

(21) Appl. No.: 17/582,381

(22) Filed: Jan. 24, 2022

(65) Prior Publication Data
US 2022/0236122 A1 Jul. 28, 2022

(30) Foreign Application Priority Data
Jan. 28, 2021 (JP) .................................. 2021-011993

(51) Int. Cl.
*G01L 1/22* (2006.01)
*G01L 1/14* (2006.01)

(52) U.S. Cl.
CPC . *G01L 1/22* (2013.01); *G01L 1/14* (2013.01)

(58) Field of Classification Search
CPC ..... H01H 2003/165; H01H 3/161–163; H01H 9/0228; H01H 2239/006; H01B 7/104–108; G01L 5/165; G01L 1/146; G01L 1/14; G01L 1/22
See application file for complete search history.

(56) References Cited

U.S. PATENT DOCUMENTS

| | | | | | |
|---|---|---|---|---|---|
| 3,778,805 | A | * | 12/1973 | Gould | G08B 13/10 340/541 |
| 4,060,705 | A | * | 11/1977 | Peachey | H01B 7/106 200/86 R |
| 4,684,768 | A | * | 8/1987 | Sackmann | E05F 15/44 200/61.43 |
| 4,762,970 | A | * | 8/1988 | Brinsley | H01B 7/10 200/86 R |
| 5,296,658 | A | * | 3/1994 | Kramer | H01H 3/142 200/61.43 |
| 6,107,580 | A | * | 8/2000 | Hoshikawa | H01H 3/142 200/61.43 |
| 6,166,338 | A | * | 12/2000 | Ebato | H01H 3/142 200/61.43 |

(Continued)

FOREIGN PATENT DOCUMENTS

JP H10281906 A 10/1998

*Primary Examiner* — Tran M. Tran
(74) *Attorney, Agent, or Firm* — Meunier Carlin & Curfman LLC

(57) ABSTRACT

A pressure sensitive sensor includes: a first conductive member formed into a long shape, the first conductive member having conductivity and elasticity; a second conductive member internally including a long space to arrange the first conductive member, the second conductive member having conductivity and elasticity; and an insulating member having an insulating property and elasticity, the insulating member holding the first conductive member to separate the first conductive member from the second conductive member, the insulating member being movable relative to one or both of the first conductive member and the second conductive member.

8 Claims, 13 Drawing Sheets

(56) References Cited

U.S. PATENT DOCUMENTS

| | | | | |
|---|---|---|---|---|
| 6,606,914 B2* | 8/2003 | Kume | ................ | G01G 19/4142 73/849 |
| 6,609,432 B2* | 8/2003 | Kume | ................... | H01H 3/142 73/862.391 |
| 6,739,198 B2* | 5/2004 | Suzuki | ................... | E05F 15/44 73/726 |
| 6,962,228 B2* | 11/2005 | Ogino | ..................... | E05F 15/42 180/274 |
| 7,150,179 B2* | 12/2006 | Takafuji | .............. | B60R 21/0136 73/12.09 |
| 7,348,506 B2* | 3/2008 | Sandbach | ............. | H01H 3/142 200/17 R |
| 7,554,045 B2* | 6/2009 | Sandbach | ................ | G01L 1/20 200/61.43 |
| 8,493,081 B2* | 7/2013 | Bolbocianu | ........... | E05F 15/443 73/862.391 |
| 9,234,979 B2* | 1/2016 | Bolbocianu | ........... | E05F 15/443 |
| 9,318,238 B2* | 4/2016 | Yamaguchi | .............. | H01B 7/04 |
| 9,417,099 B2* | 8/2016 | Bolbocianu | .............. | G01V 3/02 |
| 9,570,247 B2* | 2/2017 | Clemente | ................ | E05F 15/46 |
| 9,956,069 B2* | 5/2018 | Noesner | .................... | A61F 2/82 |
| 9,984,832 B2* | 5/2018 | Takaba | .................... | E05F 15/44 |
| 10,075,162 B2* | 9/2018 | Okada | ................. | H03K 17/962 |
| 10,099,600 B2* | 10/2018 | Ikeda | ....................... | H01H 3/00 |
| 10,370,878 B2* | 8/2019 | Orihara | .................. | E05F 15/40 |
| 10,662,693 B2* | 5/2020 | Kawase | .................. | E05F 15/44 |
| 11,769,640 B2* | 9/2023 | Osaki | ....................... | H01H 9/02 200/47 |
| 2002/0078758 A1* | 6/2002 | Suzuki | .................... | E05F 15/44 73/753 |
| 2010/0006407 A1* | 1/2010 | Masuko | .................. | E05F 15/44 200/61.44 |
| 2015/0034359 A1* | 2/2015 | Sugita | .................... | H01B 3/441 174/107 |
| 2019/0228881 A1* | 7/2019 | Furuta | ................. | B23H 11/006 |
| 2023/0230720 A1* | 7/2023 | Suzuki | ..................... | H01B 7/02 174/69 |

* cited by examiner

PRESSURE SENSITIVE SENSOR WITH CONDUCTING MEMBERS AND AN INSULATING MEMBER

CROSS-REFERENCE TO RELATED APPLICATIONS

This application claims the benefit of priority based on Japanese patent application No. 2021-011993 filed on Jan. 28, 2021 with the Japan Patent Office, and the entire disclosure of Japanese patent application No. 2021-011993 is incorporated herein by reference.

BACKGROUND

The present invention relates to a pressure sensitive sensor.

Known are pressure sensitive sensors performing a switch function when internal electric conductors are brought into a conducting state upon receiving an external force (for example, see JP H10-281906A (hereinafter, referred to as "Patent Document 1")). The pressure sensitive sensors are used in opening/closing devices such as doors, windows, and shutters, and are used to detect passing vehicles, and are used as foot-pedal switches and the like.

SUMMARY

A pressure sensitive sensor described in Patent Document 1 has a hollow helical structure. Specifically, the pressure sensitive sensor has a hollow structure extending in a longitudinal direction in the central portion of the pressure sensitive sensor. In addition, four electric conductors are arranged at regular intervals in the circumferential direction around the hollow structure and spirally extend in the longitudinal direction.

In order to realize this hollow helical structure, the pressure sensitive sensor is manufactured through processes using a spacer to form the hollow structure. Specifically, the processes to manufacture the pressure sensitive sensor include a step of forming the pressure sensitive sensor by arranging the electric conductors around the spacer and a step of pulling out the spacer thereafter.

As a result, the pressure sensitive sensor of Patent Document 1 has a disadvantage that production costs are likely to increase. That is, there has been a problem that costs are likely to increase due to the tendencies that the number of processes to form the hollow structure increases, a material cost for the spacer increases, and a processing cost increases.

The pressure sensitive sensor is arranged along a shape of a portion of the above-mentioned opening/closing device where the sensor is arranged. For example, the pressure sensitive sensor may be arranged along shapes of convexly curved portions and concavely curved portions. There has been a problem that depending on the inner structure of the pressure sensitive sensor, it can be difficult to arrange the pressure sensitive sensor along the above-mentioned curved shapes (in other words, the pressure sensitive sensor can be inferior in allowable bending performance).

The present invention has been made to solve the above-mentioned problems and aims to inhibit the increase in production costs and to provide a pressure sensitive sensor that easily ensures the allowable bending performance.

In order to achieve the above mentioned purpose, the present invention provides means as indicated below.

A pressure sensitive sensor of the present invention includes a first conductive member formed into a long shape, the first conductive member having conductivity and elasticity; a second conductive member internally including a long space to arrange the first conductive member, the second conductive member having conductivity and elasticity; and an insulating member having an insulating property and elasticity, the insulating member holding the first conductive member to separate the first conductive member from the second conductive member, the insulating member being movable relative to at least one of the first conductive member and the second conductive member.

The pressure sensitive sensor of the present invention has a configuration in which the first conductive member and the second conductive member are coaxially arranged and between the first conductive member and the second conductive member, the insulating member is arranged and a space is formed. With this configuration, it is possible to manufacture the pressure sensitive sensor by a manufacturing method not using a spacer, such as extrusion molding, instead of the manufacturing method using the spacer as described in Patent Document 1.

The present invention has a configuration in which the insulating member is movable relative to at least one of the first conductive member and the second conductive member. Thus, the differences in expansion and contraction between the first conductive member and the second conductive member generated when the pressure sensitive sensor is bent can be easily absorbed by the above-described relative movement.

The pressure sensitive sensor of the present invention has effects of easily inhibiting the increase in manufacturing costs and easily ensuring the allowable bending performance.

DETAILED DESCRIPTION OF EXEMPLARY EMBODIMENTS

First Embodiment

Figure 1:
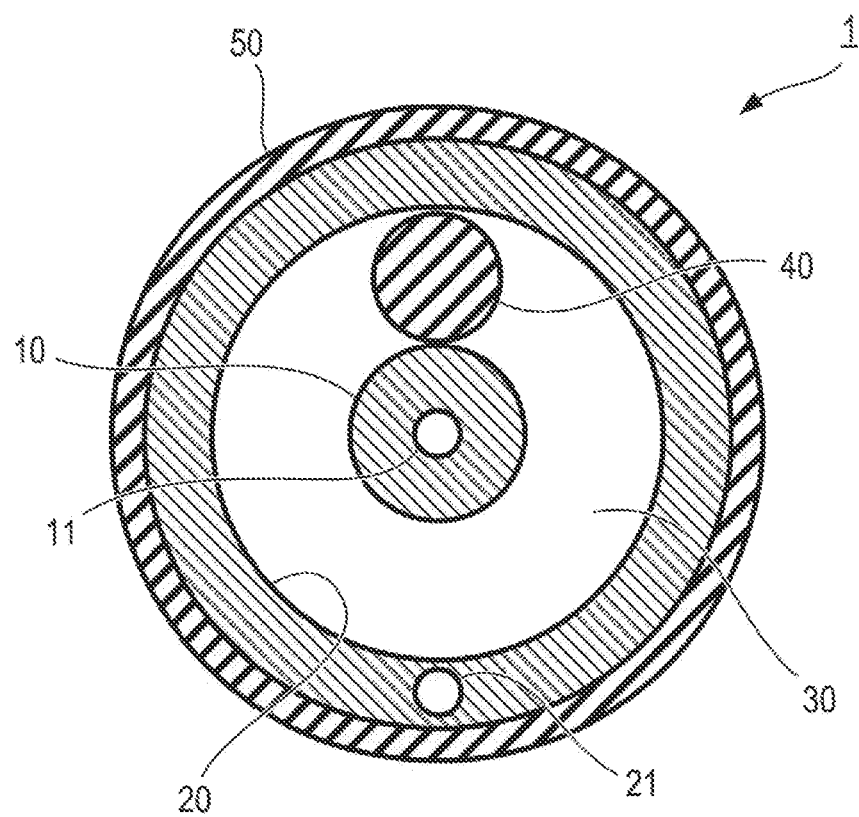
FIG. 1 is a transverse sectional view showing a configuration of a pressure sensitive sensor according to a first embodiment of the present invention.

Hereinafter, a pressure sensitive sensor 1 according to a first embodiment of the present invention will be described with reference to FIG. 1 to FIG. 8. The pressure sensitive sensor 1 of the present embodiment has a circular columnar or cylindrical shape having a desired length. FIG. 1 shows a sectional configuration of the pressure sensitive sensor 1 according to the first embodiment.

The pressure sensitive sensor 1 has a shape extending towards the front side and the back side of the plane of paper of FIG. 1. In this embodiment, an example will be described in which the pressure sensitive sensor 1 has a diameter of 4 mm. The diameter of the pressure sensitive sensor 1 may be smaller or larger than 4 mm.

The pressure sensitive sensor 1 includes, as shown in FIG. 1, a first conductive member 10, a second conductive member 20, a first insulating member (corresponding to an insulating member) 40 and a second insulating member 50 as main components.

The first conductive member 10 is a member arranged inside the second conductive member 20. The first conductive member 10 is a member formed into a circular columnar shape and formed of a material having conductivity and elasticity. In this embodiment, an example will be described in which the first conductive member 10 has a circular shape in the transverse sectional view. Examples of the material to form the first conductive member 10 may include a conductive rubber containing carbon black.

The first conductive member 10 includes a first conductor 11. The first conductor 11 is a wire rod formed of a metallic material having conductivity. The first conductor 11 is arranged along a center line in the circular columnar first conductive member 10. In other words, the first conductor 11 is arranged coaxially with the first conductive member 10. The first conductor 11 may be arranged in a place other than the center line in the first conductive member 10 as long as the first conductor 11 is arranged to be electrically conductive with the first conductive member 10.

The second conductive member 20 is a cylindrical member having an internal space 30, in which the first conductive member 10 and the first insulating member 40 are arranged. The second conductive member 20 is a member formed of a material having conductivity and elasticity. Examples of the material forming the second conductive member 20 may include conductive rubber such as polyolefin containing carbon black.

The second conductive member 20 includes a second conductor 21. The second conductor 21 is a wire rod formed of a metallic material having conductivity. The second conductor 21 is arranged along the longitudinal direction in a peripheral wall of the cylindrical second conductive member 20.

In this embodiment, a description will be made of an example in which the second conductor 21 is arranged at a position (or also referred to as "phase") opposite the first insulating member 40 across the first conductive member 10. The position where the second conductor 21 is arranged in the second conductive member 20 may be the above-mentioned position opposite the first insulating member 40, or may be other position.

In this embodiment, a description will be made of an example in which the first conductor 11 and the second conductor 21 are tin-plated annealed copper stranded wires. Examples of the metallic material forming the first conductor 11 and the second conductor 21 may be a copper alloy containing copper as a component, silver, and a silver alloy containing silver as a component.

The first insulating member 40 is a circular columnar member arranged in the space 30 of the second conductive member 20 together with the first conductive member 10. The first insulating member 40 has a diameter equal to an interval in a radial direction from the first conductive member 10 to the second conductive member 20.

The first insulating member 40 is spirally arranged along a peripheral surface that is a surface of the first conductive member 10. In this embodiment, a description will be made of an example in which the first insulating member 40 is a member holding the first conductive member 10 at a position coaxial with the second conductive member 20.

The amount of movement (also referred to as "spiral pitch") of the first insulating member 40 in the longitudinal direction produced while it goes around the first conductive member 10 one time can be appropriately set and is not particularly limited. Examples of a material forming the first insulating member 40 may include a rubber material, such as polyolefin, having an insulating property.

In this embodiment, a portion of the first insulating member 40 in contact with the first conductive member 10 is fusion-bonded with the first conductive member 10. In other words, the first insulating member 40 is fixed to the first conductive member 10. On the other hand, a portion of the first insulating member 40 in contact with the second conductive member 20 is not fusion-bonded with the second conductive member 20. In other words, the first insulating member 40 is movable relative to the second conductive member 20. If the first insulating member 40 and the first conductive member 10 use the same rubber material, they can be easily fixed by fusion-bonding.

In this embodiment, a description will be made of an example in which the first insulating member 40 and the first conductive member 10 are fusion-bonded, and the first insulating member 40 and the second conductive member 20 are not fusion-bonded; alternatively, a configuration may be adopted in which the first insulating member 40 and the first conductive member 10 are not fusion-bonded and the first insulating member 40 and the second conductive member 20 are fusion-bonded. Furthermore, a configuration may also be adopted in which the first insulating member 40 and the first conductive member 10 are not fusion-bonded and the first insulating member 40 and the second conductive member 20 are not fusion-bonded.

The second insulating member 50 is a cylindrical member that covers the outer peripheral surface of the second conductive member 20 and that forms an outer shape of the pressure sensitive sensor 1. Examples of a material forming the second insulating member 50 may include a rubber material, such as polyurethane, having an insulating property.

In this embodiment, a portion of the second insulating member 50 in contact with the second conductive member 20 is not fusion-bonded with the second conductive member 20. In other words, the second insulating member 50 is movable relative to the second conductive member 20. The second insulating member 50 may be fusion-bonded with the second conductive member 20. In other words, the second insulating member 50 may be fixed with the second conductive member 20.

Figure 2:
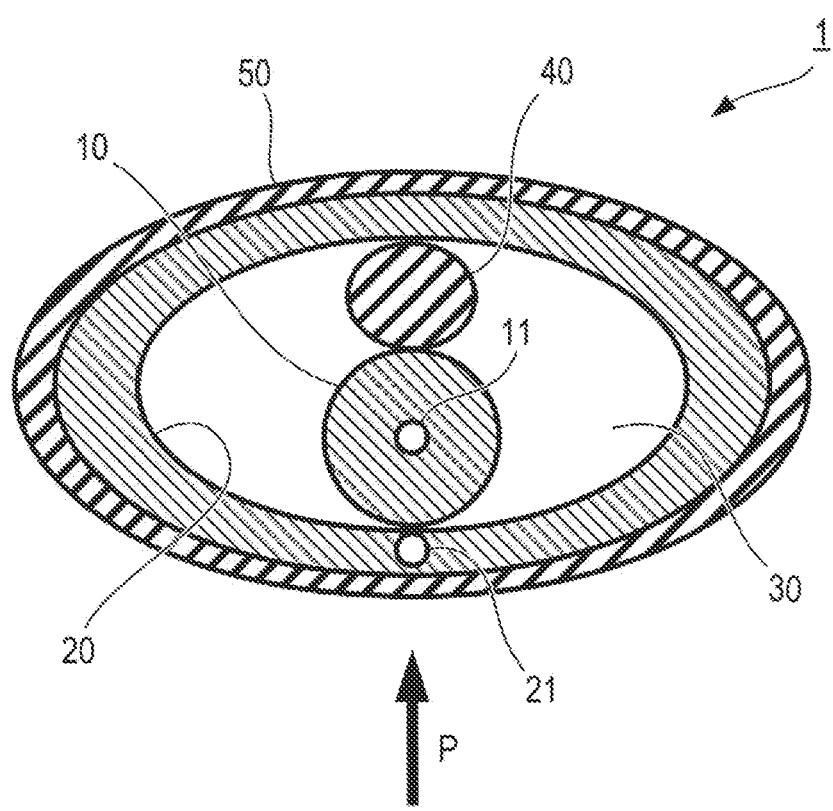
FIG. 2 is a transverse sectional view showing a state where a first conductive member and a second conductive member of the pressure sensitive sensor of FIG. 1 are electrically connected.

Next, a description will be made of an action of the pressure sensitive sensor 1 having the above-described configuration. FIG. 2 shows a state where the first conductive member 10 and the second conductive member 20 of the pressure sensitive sensor 1 are electrically connected.

When pressing force P is not applied to the pressure sensitive sensor 1, the first conductive member 10 and the second conductive member 20 are separated by the space 30 and the first insulating member 40 as shown in FIG. 1. That is, the first conductive member 10 and the second conductive member 20 are electrically separated as well.

When the pressing force P is applied to the pressure sensitive sensor 1, the second insulating member 50 and the second conductive member 20 are elastically deformed as shown in FIG. 2. In this embodiment, a description will be made of an example in which the pressing force P directing from outside to the first conductive member 10 is applied. A part of the second conductive member 20, to which the pressing force P is applied, is deformed towards the first conductive member 10, and comes in contact with the first conductive member 10. In other words, the first conductive member 10 and the second conductive member 20 become electrically conductive.

It is possible to detect whether the pressing force P is applied to the pressure sensitive sensor 1 based on the presence or absence of conductivity between the first conductive member 10 and the second conductive member 20. It may be detected whether the pressing force P is applied to the pressure sensitive sensor 1 based on a resistance value between the first conductive member 10 and the second conductive member 20.

Figure 3:
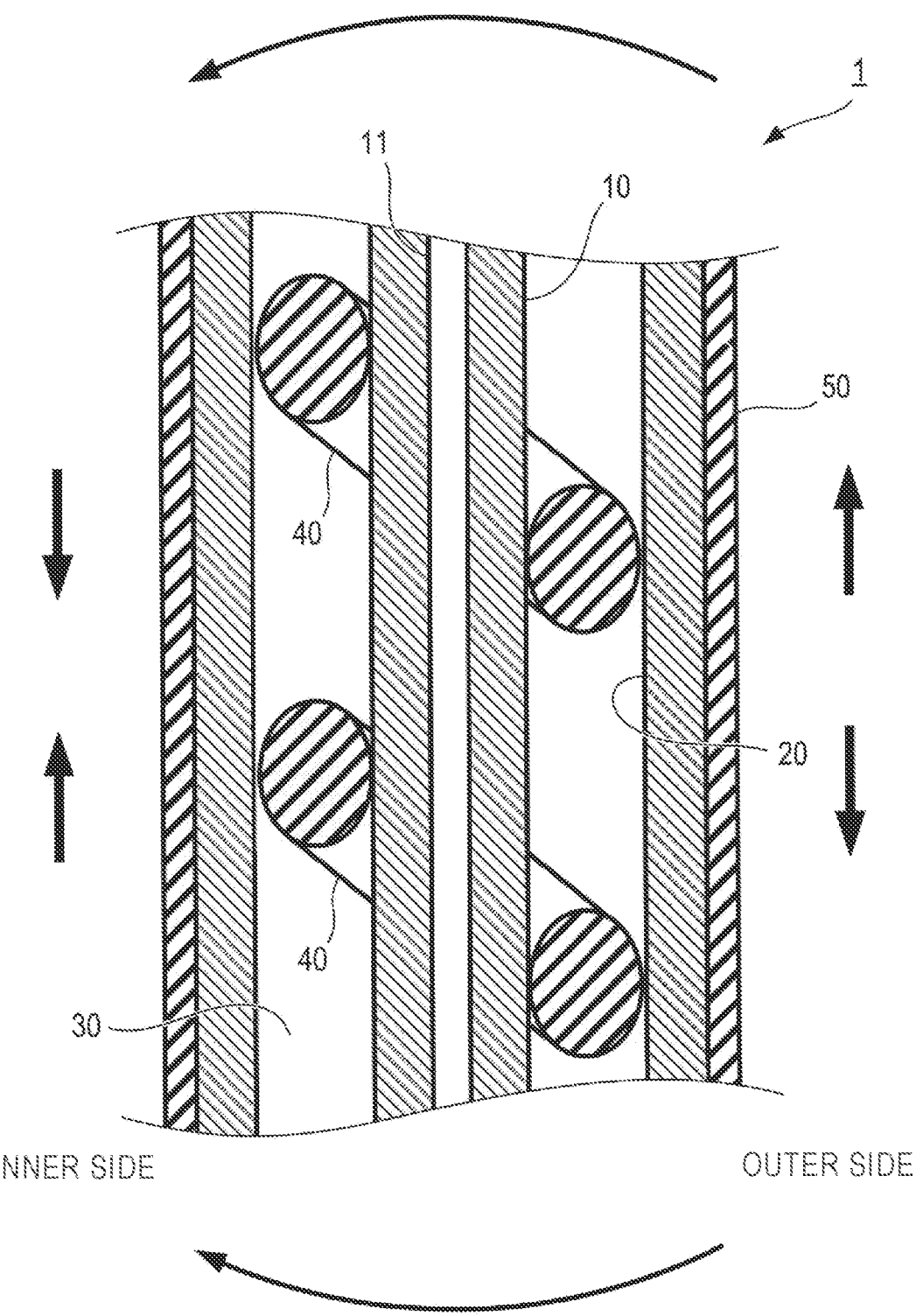
FIG. 3 is a longitudinal sectional view showing a state where a pressure sensitive sensor of FIG. 1 is bent.

Then, a description will be made of a case where the pressure sensitive sensor 1 having the above-described configuration is bent. FIG. 3 shows a state when the pressure sensitive sensor 1 is bent.

When the pressure sensitive sensor 1 is bent, as shown in FIG. 3, force in a contracting direction is applied to an inner side portion (left portion in FIG. 3) of the pressure sensitive sensor 1, and force in an expanding direction is applied to an outer side portion (right portion in FIG. 3) of the pressure sensitive sensor 1.

The force in the contracting direction and the force in the expanding direction acting on the second conductive member 20 arranged on an outer peripheral side of the pressure sensitive sensor 1 are stronger than force in the contracting direction and force in the expanding direction acting on the first conductive member 10 arranged at the center of the pressure sensitive sensor 1.

Since the second conductive member 20 is not fusion-bonded with the first insulating member 40, the second conductive member 20 is in contact with the first insulating member 40 to be relatively movable. Thus, the inner side portion of the second conductive member 20 contracts while moving in a longitudinal direction relative to the first insulating member 40. The outer side portion of the second conductive member 20 expands while moving in the longitudinal direction relative to the first insulating member 40.

In contrast, when the second conductive member 20 is fusion-bonded and integrated with the first insulating member 40, the inner side portion of the second conductive member 20 is constrained by the first insulating member 40 and the first conductive member 10 and is less likely to contract. The outer side portion of the second conductive member 20 is constrained by the first insulating member 40 and the first conductive member 10 and is less likely to expand.

The force in the contracting direction and the force in the expanding direction acting on the second insulating member 50 arranged on the outer peripheral side of the second conductive member 20 are stronger than force in the contracting direction and force in the expanding direction acting on the second conductive member 20 arranged on a center side.

Since the second insulating member 50 is not fusion-bonded with the second conductive member 20, the second insulating member 50 is in contact with the second conductive member 20 to be relatively movable. Thus, the inner side portion of the second insulating member 50 contracts while moving in the longitudinal direction relative to the second conductive member 20. The outer side portion of the second insulating member 50 expands while moving in the longitudinal direction relative to the second conductive member 20.

In contrast, when the second insulating member 50 is fusion-bonded and integrated with the second conductive member 20, the inner side portion of the second insulating member 50 is constrained by the second conductive member 20 and is less likely to contract. The outer side portion of the second insulating member 50 is constrained by the second conductive member 20 and is less likely to expand.

Next, a description will be made of an example of a method for manufacturing the pressure sensitive sensor 1 having the above-described configuration with reference to FIG. 1.

First, the first conductive member 10 is formed by a well-known manufacturing method, such as extrusion molding. The first conductive member 10 is formed into a circular columnar shape having the first conductor 11 arranged inside.

Then, the circular columnar first insulating member 40 is spirally arranged around the first conductive member 10. The first insulating member 40 is formed by a well-known manufacturing method, such as extrusion molding. When the first insulating member 40 is arranged, management is performed to adjust temperature of the first conductive member 10 and the first insulating member 40 to temperature at which they are mutually fusion-bonded. The fusion-bonding temperature is temperature determined in accordance with types of materials forming the first conductive member 10 and the first insulating member 40. The first conductive member 10 and the first insulating member 40 may be fixed using an adhesive agent.

Next, the cylindrical second conductive member 20 is arranged around the first insulating member 40. At this time, the space 30 is formed between the first conductive member 10 and the second conductive member 20. The second conductive member 20 is formed by a well-known manufacturing method, such as extrusion molding. When the second conductive member 20 is arranged, management is performed to adjust temperature of the first insulating member 40 and the second conductive member 20 to temperature at which they are not fusion-bonded.

Here, the temperature at which no fusion-bonding occurs is temperature less than temperature at which the first insulating member 40 and the second conductive member 20 are fusion-bonded. The temperature at which no fusion-bonding occurs is temperature determined in accordance with types of materials forming the first insulating member 40 and the second conductive member 20.

Next, the cylindrical second insulating member 50 is arranged around the second conductive member 20. The second insulating member 50 is formed by a well-known manufacturing method, such as extrusion molding. When the second insulating member 50 is arranged, management is performed to adjust temperature of the second conductive member 20 and the second insulating member 50 to temperature at which the second conductive member 20 and the second insulating member 50 are not mutually fusion-bonded. Through the above-described processes, the pressure sensitive sensor 1 is manufactured.

Here, the temperature at which no fusion-bonding occurs is temperature less than temperature at which the second conductive member 20 and the second insulating member 50 are fusion-bonded. The temperature at which no fusion-bonding occurs is temperature determined in accordance with types of materials forming the second conductive member 20 and the second insulating member 50.

The above-described pressure sensitive sensor 1 has a configuration in which the first conductive member 10 and the second conductive member 20 are coaxially arranged, and between the first conductive member 10 and the second conductive member 20, the first insulating member 40 is arranged and the space 30 is formed. With such a configuration, the pressure sensitive sensor 1 can be produced by a manufacturing method not using a spacer, such as extrusion molding, and an increase in manufacturing costs can be easily inhibited.

The pressure sensitive sensor 1 has a configuration in which the first insulating member 40 and the second conductive member 20 are movable relative to each other. Thus, the differences in expansion and contraction between the first conductive member 10 and the second conductive member 20 generated when the pressure sensitive sensor 1 is bent are easily absorbed by the relative movement of the first insulating member 40 and the second conductive member 20. That is, it is easy to ensure an allowable bending performance of the pressure sensitive sensor 1.

The allowable bending performance of the pressure sensitive sensor 1 is also easily ensured in a configuration in which the first insulating member 40 and the first conductive member 10 are movable relative to each other. In addition, the allowable bending performance of the pressure sensitive sensor 1 can be furthermore easily ensured by adopting a configuration in which the second insulating member 50 and the second conductive member 20 are movable relatively to each other.

The first insulating member 40 is spirally arranged around the first conductive member 10, whereby the first conductive member 10 can be held to be separated from the second conductive member 20 by one first insulating member 40. In comparison with a case where multiple first insulating members 40 are used, the second conductive member 20 easily deforms in response to the force from outside, and the second conductive member 20 and the first conductive member 10 easily come in contact with each other. Also, the number of the first insulating member 40 can be reduced, which contributes to reduction of manufacturing costs.

The pressure sensitive sensor 1 is not limited to the shape described in the above embodiment, and may have other shapes. For example, the pressure sensitive sensor 1 may have various shapes as described below.

Figure 4A:
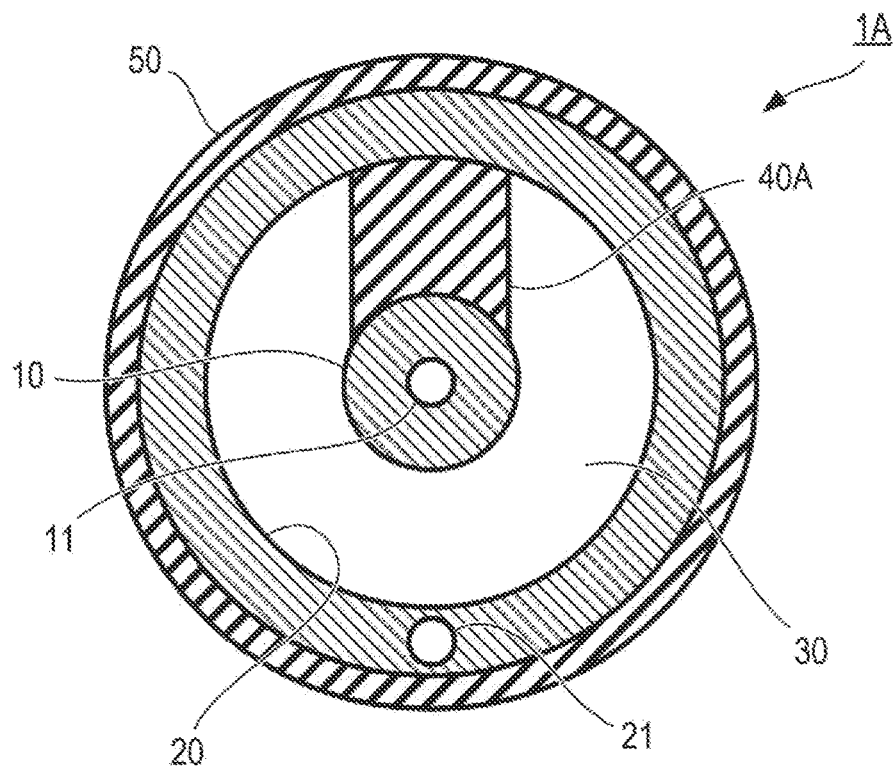
FIG. 4A is a transverse sectional view showing a configuration of a first variation of the pressure sensitive sensor of FIG. 1.

FIG. 4A is a transverse sectional view showing a configuration of a pressure sensitive sensor 1A. In the pressure sensitive sensor 1A, a shape of a first insulating member 40A is different compared to the pressure sensitive sensor 1. Other components than the first insulating member 40A have the same shapes as those of the pressure sensitive sensor 1.

The first insulating member 40A is a member formed into a rectangular columnar shape. The first insulating member 40A is spirally arranged along a circumferential surface of the first conductive member 10. The first insulating member 40A has a substantially rectangular shape extending in the radial direction from the first conductive member 10 towards the second conductive member 20 in the transverse sectional view.

The surface of the first insulating member 40A in contact with the first conductive member 10 has a concavely curved shape along the peripheral surface of the first conductive member 10, and is fusion-bonded with the first conductive member 10. The surface of the first insulating member 40A in contact with the second conductive member 20 has a convexly curved shape along the inner peripheral surface of the second conductive member 20, and is not fusion-bonded with the second conductive member 20.

Since the first insulating member 40A is a member formed into the rectangular columnar shape, in comparison with the first insulating member 40 formed into a circular columnar shape, it is easy to increase areas in contact with the first conductive member 10 and the second conductive member 20. Thus, the first insulating member 40A can stably hold the first conductive member 10.

Figure 4B:
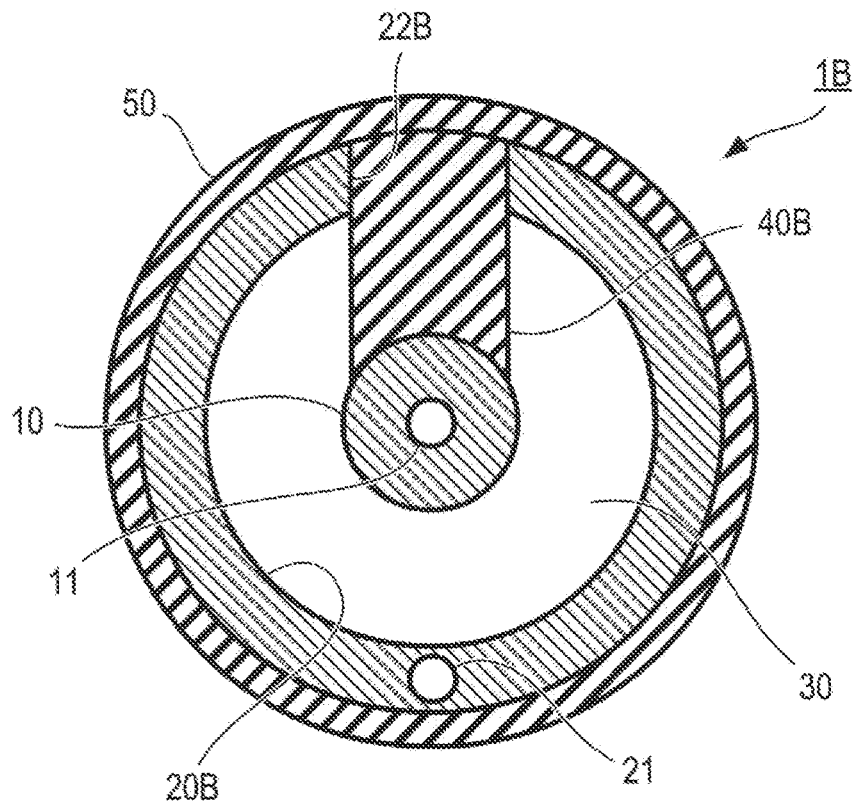
FIG. 4B is a transverse sectional view showing a configuration of a second variation of the pressure sensitive sensor of FIG. 1.

FIG. 4B is a transverse sectional view showing a configuration of a pressure sensitive sensor 1B. In the pressure sensitive sensor 1B, shapes of a second conductive member 20B and a first insulating member 40B are different compared to the pressure sensitive sensor 1. Other components than the second conductive member 20B and the first insulating member 40B have the same shapes as those of the pressure sensitive sensor 1.

The second conductive member 20B is a cylindrical member having the internal space 30, in which the first conductive member 10 and the first insulating member 40B are arranged. The second conductive member 20B includes a slit 22B, in which an end of the first insulating member 40B is arranged. The slit 22B is a groove-shaped cutout formed in the second conductive member 20B and spirally extends in the longitudinal direction along a circumferential surface of the second conductive member 20B.

The first insulating member 40B is a member formed into a rectangular columnar shape like the first insulating member 40A. The end of the first insulating member 40B on a second conductive member 20B side passes through the inside of the slit 22B and is in contact with an inner peripheral surface of the second insulating member 50.

The first insulating member 40B is not fusion-bonded with the second conductive member 20B and the second insulating member 50. In other words, the first insulating member 40B is movable relative to the second conductive member 20B and the second insulating member 50.

Since the end of the first insulating member 40B passes through the inside of the slit 22B, it is easy to maintain an arrangement relationship between the first insulating member 40B and the second conductive member 20B in comparison with the pressure sensitive sensor 1 and the pressure sensitive sensor 1A.

Figure 5A:
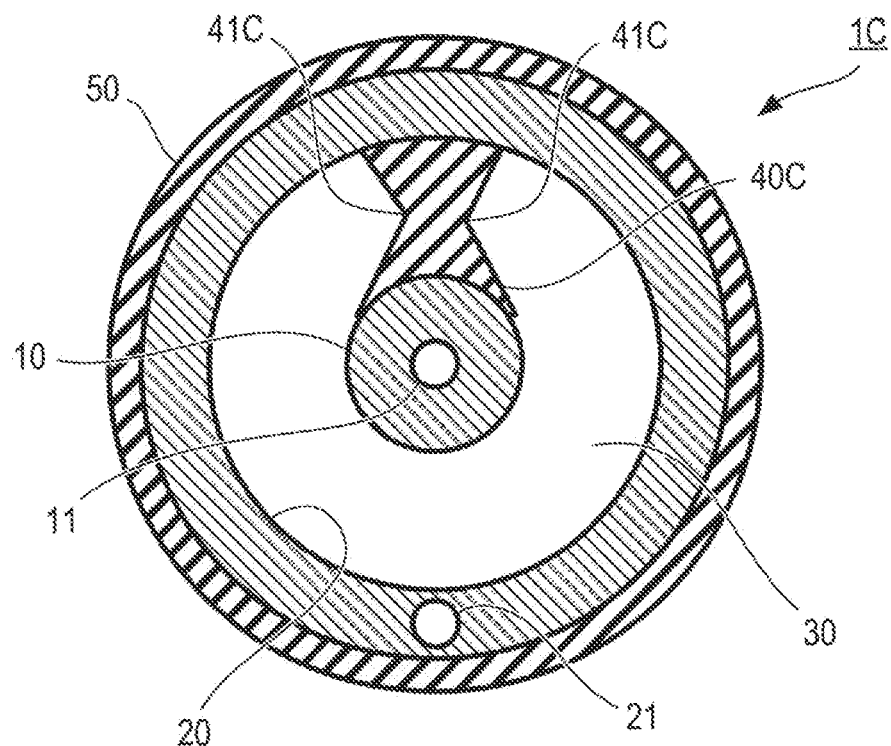
FIG. 5A is a transverse sectional view showing a configuration of a third variation of the pressure sensitive sensor of FIG. 1.

FIG. 5A is a transverse sectional view showing a configuration of a pressure sensitive sensor 1C. In the pressure sensitive sensor 1C, a shape of a first insulating member 40C is different compared to the pressure sensitive sensor 1. Other components than the first insulating member 40C have the same shapes as those of the pressure sensitive sensor 1.

The first insulating member 40C is a member spirally arranged along a circumferential surface of the first conductive member 10. In the transverse sectional view, the first insulating member 40C has a shape extending in the radial direction from the first conductive member 10 towards the second conductive member 20 and has a shape with recesses 41C.

The surface of the first insulating member 40C in contact with the first conductive member 10 has a concavely curved shape along the peripheral surface of the first conductive member 10, and is fusion-bonded with the first conductive member 10. The surface of the first insulating member 40C in contact with the second conductive member 20 has a convexly curved shape along the inner peripheral surface of the second conductive member 20, and is not fusion-bonded with the second conductive member 20.

The recess 41C is provided in each of a pair of surfaces of the first insulating member 40C extending between the first conductive member 10 and the second conductive member 20. In this embodiment, a description will be made of an example in which the recess 41C is a groove having a substantially V-shape formed in the first insulating member 40C.

In comparison with the case where the recesses 41C are not provided, the first insulating member 40C with the pair of recesses 41C can have a part narrow in width and can easily buckle (or bend). Therefore, the first conductive member 10 and the second conductive member 20 easily come closer and come in contact with each other in comparison with the case where the recesses 41C are not provided.

In this embodiment, a description has been made of an example in which the pair of recesses 41C is provided in the first insulating member 40C; alternatively, only one recess 41C may be provided. The shape of the recess 41C may be a V-shape or may be other shape, such as a U-shape, which allows the first insulating member 40C to easily buckle. The position of this recess 41C is preferably near the middle between the circumferential surface of the first conductive member 10 and the circumferential surface of the second conductive member 20, which helps buckling.

Figure 5B:
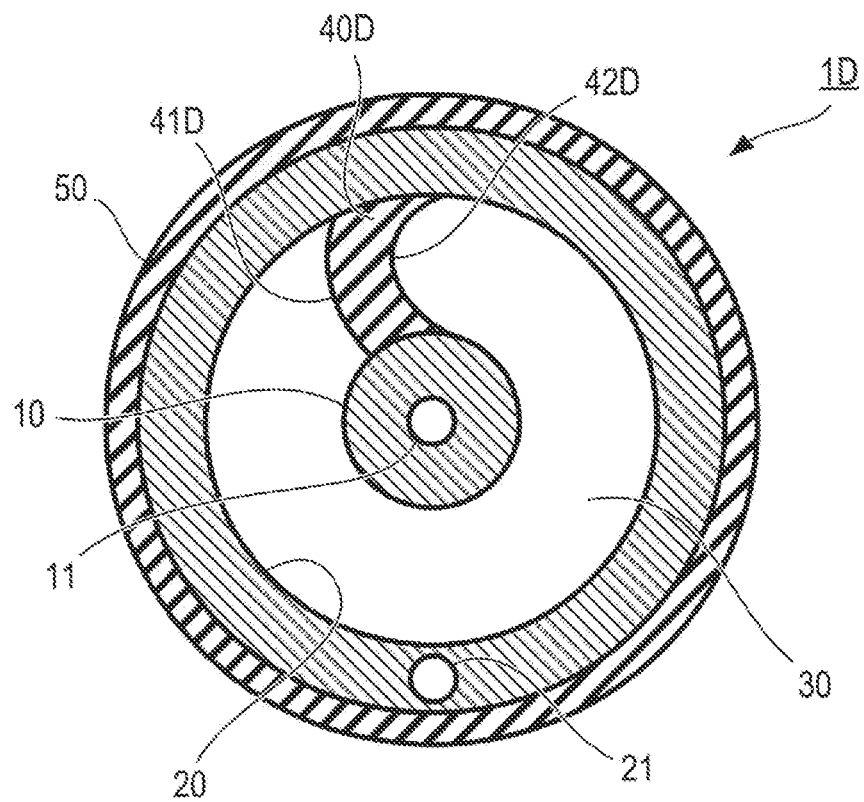
FIG. 5B is a transverse sectional view showing a configuration of a fourth variation of the pressure sensitive sensor of FIG. 1.

FIG. 5B is a transverse sectional view showing a configuration of a pressure sensitive sensor 1D. In the pressure sensitive sensor 1D, a shape of a first insulating member 40D is different compared to the pressure sensitive sensor 1. Other components than the first insulating member 40D have the same shapes as those of the pressure sensitive sensor 1.

The first insulating member 40D is a member spirally arranged along the circumferential surface of the first conductive member 10. The first insulating member 40D has a curved rectangular shape extending in the radial direction from the first conductive member 10 towards the second conductive member 20 in the transverse sectional view.

The surface of the first insulating member 40D in contact with the first conductive member 10 has a concavely curved shape along the peripheral surface of the first conductive member 10, and is fusion-bonded with the first conductive member 10. The surface of the first insulating member 40D in contact with the second conductive member 20 has a convexly curved shape along the inner peripheral surface of the second conductive member 20, and is not fusion-bonded with the second conductive member 20.

In the first insulating member 40D, one surface 41D of a pair of surfaces extending between the first conductive member 10 and the second conductive member 20 has a convexly curved shape. The other surface 42D of the pair of surfaces has a concavely curved shape.

In this embodiment, a description has been made of an example in which the first insulating member 40D has a shape convexly curved in a counterclockwise direction in FIG. 5B; alternatively, the first insulating member 40D may have a shape convexly curved in a clockwise direction. In the embodiment shown in FIG. 5B, the first insulating member 40D is spirally arranged in the counterclockwise direction along the circumferential surface of the first conductive member 10.

The first insulating member 40D has a curved rectangular shape. Thus, the first insulating member 40D easily buckles (or bends) when the pressing force P is applied in comparison with a case where the first insulating member 40D does not have the curved rectangular shape. Therefore, the first conductive member 10 and the second conductive member 20 easily come in contact with each other.

Figure 6A:
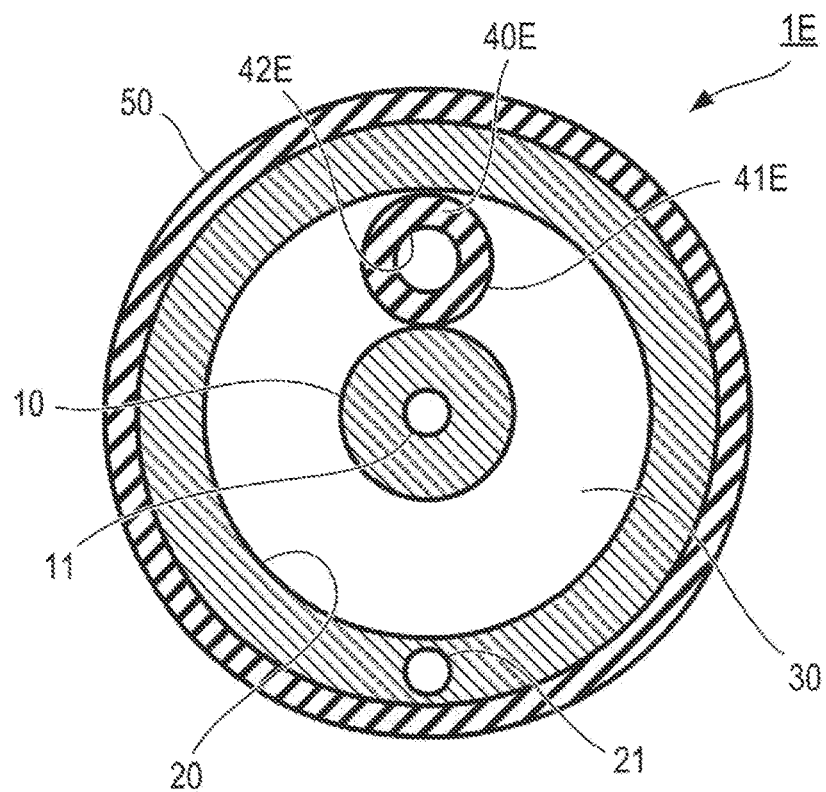
FIG. 6A is a transverse sectional view showing a configuration of a fifth variation of the pressure sensitive sensor of FIG. 1.

FIG. 6A is a transverse sectional view showing a configuration of a pressure sensitive sensor 1E. In the pressure sensitive sensor 1E, a shape of a first insulating member 40E is different compared to the pressure sensitive sensor 1. Other components than the first insulating member 40E have the same shapes as those of the pressure sensitive sensor 1.

The first insulating member 40E is a member formed into a cylindrical shape. The first insulating member 40E is spirally arranged along the circumferential surface of the first conductive member 10. In the transverse sectional view, the first insulating member 40E has a shape having an outer peripheral surface 41E and an inner peripheral surface 42E.

The outer peripheral surface 41E has a diameter equal to an interval in the radial direction from the first conductive member 10 to the second conductive member 20. The outer peripheral surface 41E is in contact with the first conductive member 10 and the second conductive member 20.

A portion of the outer peripheral surface 41E of the first insulating member 40E in contact with the first conductive member 10 is fusion-bonded with the first conductive member 10. A portion of the outer peripheral surface 41E of the first insulating member 40E in contact with the second conductive member 20 is not fusion-bonded with the second conductive member 20.

The first insulating member 40E has a hollow cylindrical shape. Thus, the first insulating member 40E is easily crushed when the pressing force P is applied in comparison with a case where the first insulating member 40E has a solid shape. Therefore, the first conductive member 10 and the second conductive member 20 easily come in contact with each other.

Figure 6B:
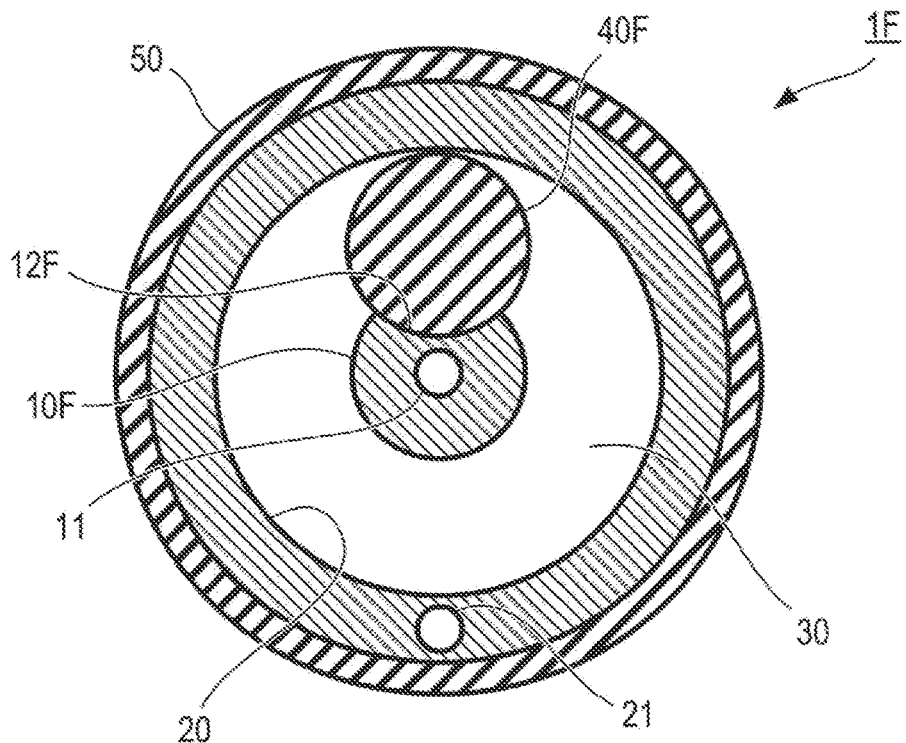
FIG. 6B is a transverse sectional view showing a configuration of a sixth variation of the pressure sensitive sensor of FIG. 1.

FIG. 6B is a transverse sectional view showing a configuration of a pressure sensitive sensor 1F. In the pressure sensitive sensor 1F, shapes of a first conductive member 10F and a first insulating member 40F are different compared to the pressure sensitive sensor 1. Other components than the first conductive member 10F and the first insulating member 40F have the same shapes as those of the pressure sensitive sensor 1.

The first conductive member 10F is a member formed into a substantially circular columnar shape. The first conductive member 10F has a concave groove 12F in the peripheral surface thereof to arrange the first insulating member 40F. The groove 12F is formed to spirally extend in a longitudinal direction of the first conductive member 10F.

The first insulating member 40F is a member formed into a circular columnar shape. The first insulating member 40F is spirally arranged along the groove 12F of the first conductive member 10F. In the transverse sectional view, the diameter of the first insulating member 40F is larger than the interval in the radial direction from the first conductive member 10F to the second conductive member 20.

The first insulating member 40F is fusion-bonded with the first conductive member 10F at the groove 12F. A portion of the first insulating member 40F in contact with the inner peripheral surface of the second conductive member 20 is not fusion-bonded with the second conductive member 20.

Since the first insulating member 40F is arranged in the groove 12F of the first conductive member 10F, it is easy to ensure a contact area between the first insulating member 40F and the first conductive member 10F. In other words, it is easy to ensure a fusion-bonding area between the first insulating member 40F and the first conductive member 10F.

Figure 7A:
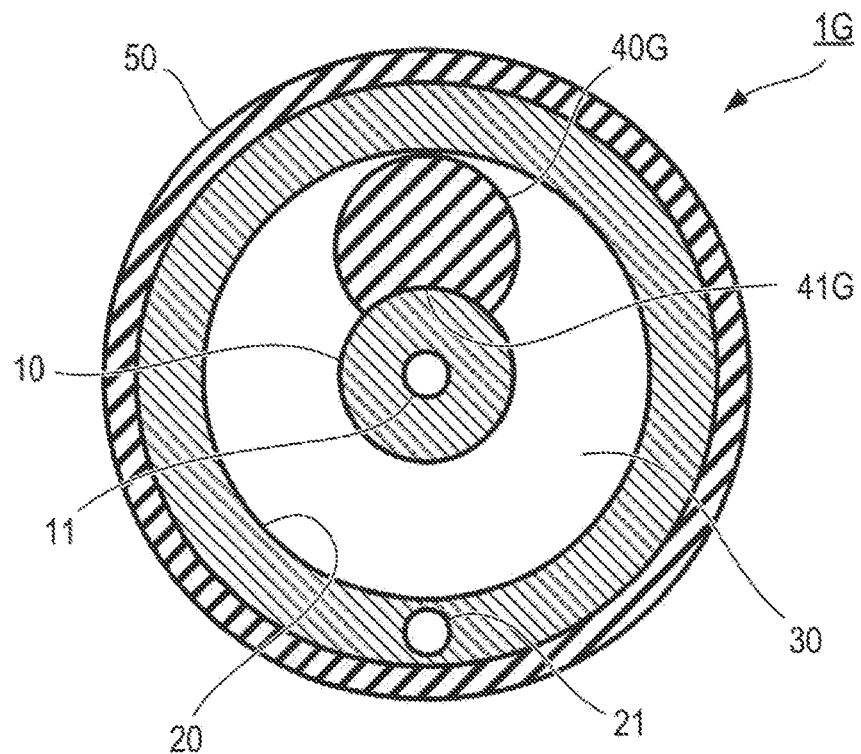
FIG. 7A is a transverse sectional view showing a configuration of a seventh variation of the pressure sensitive sensor of FIG. 1.

FIG. 7A is a transverse sectional view showing a configuration of a pressure sensitive sensor 1G. In the pressure sensitive sensor 1G, a shape of a first insulating member 40G is different compared to the pressure sensitive sensor 1. Other components than the first insulating member 40G have the same shapes as those of the pressure sensitive sensor 1.

The first insulating member 40G is a member formed into a substantially circular columnar shape. In the transverse sectional view, the diameter of the first insulating member 40G is larger than the interval in the radial direction from the first conductive member 10 to the second conductive member 20. The first insulating member 40G is spirally arranged along the circumferential surface of the first conductive member 10.

The first insulating member 40G has a concave groove 41G in a circumferential surface thereof to arrange the first conductive member 10. The first insulating member 40G is fusion-bonded with the first conductive member 10 at the groove 41G. A portion of the first insulating member 40G in contact with the inner peripheral surface of the second conductive member 20 is not fusion-bonded with the second conductive member 20.

Since the first conductive member 10 is arranged in the groove 41G of the first insulating member 40G, it is easy to ensure a contact area between the first insulating member 40G and the first conductive member 10. In other words, it is easy to ensure a fusion-bonding area between the first insulating member 40G and the first conductive member 10.

Figure 7B:
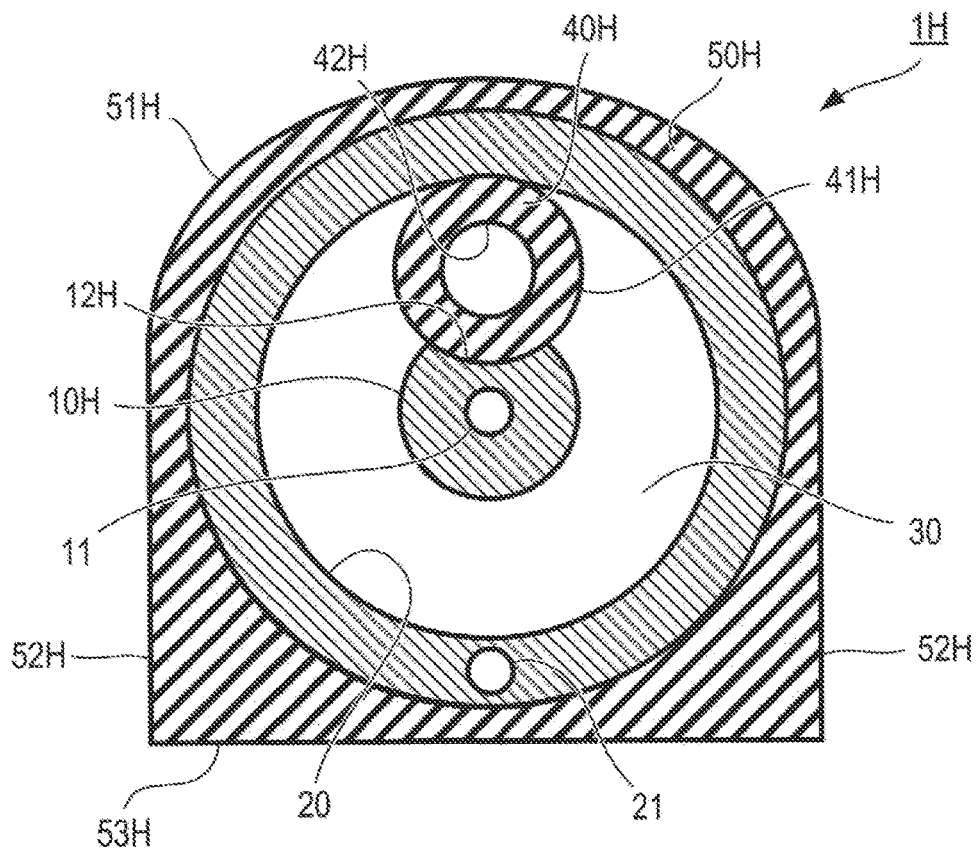
FIG. 7B is a transverse sectional view showing a configuration of an eighth variation of the pressure sensitive sensor of FIG. 1.

FIG. 7B is a transverse sectional view showing a configuration of a pressure sensitive sensor 1H. In the pressure sensitive sensor 1H, shapes of a first conductive member 10H, a first insulating member 40H, and a second insulating member 50H are different compared to the pressure sensitive sensor 1. Other components than the first conductive member 10H, the first insulating member 40H and the second insulating member 50H have the same shapes as those of the pressure sensitive sensor 1.

The first conductive member 10H is a member formed into a substantially circular columnar shape. The first conductive member 10H has a concave groove 12H in the peripheral surface thereof to arrange the first insulating member 40H. The groove 12H is formed to spirally extend in a longitudinal direction of the first conductive member 10H.

The first insulating member 40H is a member formed into a cylindrical shape. The first insulating member 40H is spirally arranged along the groove 12H of the first conductive member 10H. In the transverse sectional view, the first insulating member 40H has a shape having an outer peripheral surface 41H and an inner peripheral surface 42H. The diameter of the first insulating member 40H is larger than an interval in the radial direction from the first conductive member 10H to the second conductive member 20.

The first insulating member 40H is fusion-bonded with the first conductive member 10H at the groove 12H. A portion of the first insulating member 40H in contact with the inner peripheral surface of the second conductive member 20 is not fusion-bonded with the second conductive member 20.

The second insulating member 50H is a member that covers the outer peripheral surface of the second conductive member 20 and that forms the outer shape of the pressure sensitive sensor 1H. The second insulating member 50H has a D-shaped outer shape in the transverse sectional view.

Specifically, the second insulating member 50H has a curved surface 51H extending along the second conductive member 20, a pair of side surfaces 52H, 52H having planar shapes extending from both ends of the curved surface 51H, and an end surface 53H having a planar shape arranged between the pair of side surfaces 52H, 52H.

Since the second insulating member 50H has the end surface 53H, the pressure sensitive sensor 11H can be easily arranged. That is, when the pressure sensitive sensor 1H is arranged on a target, it becomes easy to stabilize an arrangement posture of the pressure sensitive sensor 1H by placing the end surface 53H in contact with the target. Stabilization of the arrangement posture of the pressure sensitive sensor 1H facilitates the arrangement.

Figure 8:
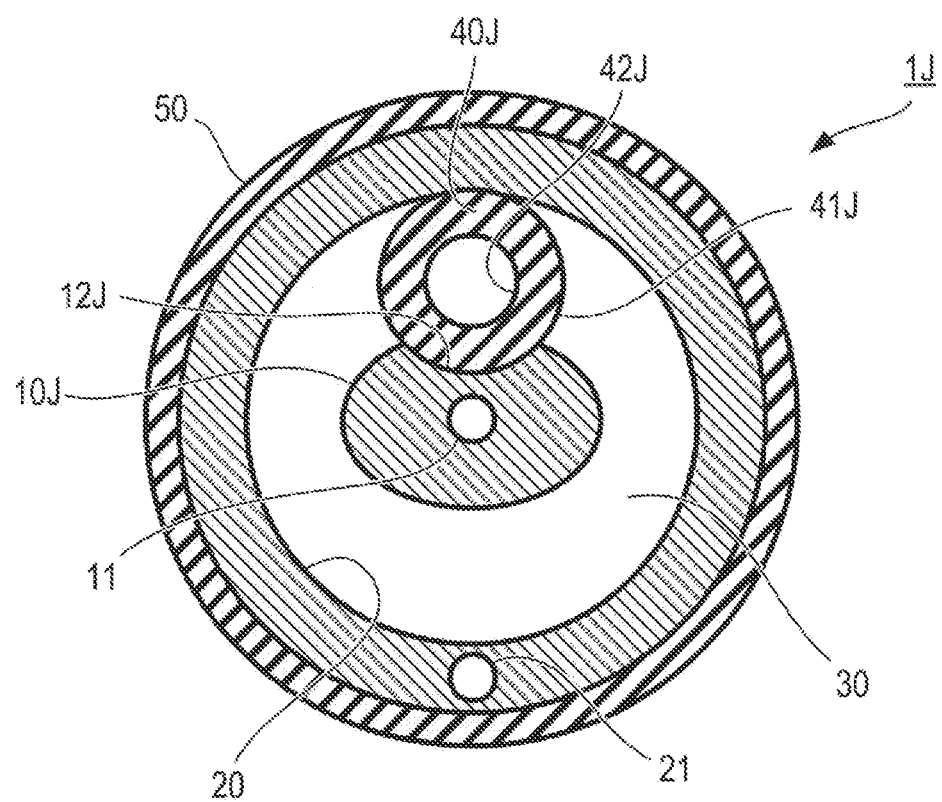
FIG. 8 is a transverse sectional view showing a configuration of a ninth variation of the pressure sensitive sensor of FIG. 1.

FIG. 8 is a transverse sectional view showing a configuration of a pressure sensitive sensor 1J. In the pressure sensitive sensor 1J, shapes of a first conductive member 10J and a first insulating member 40J are different compared to the pressure sensitive sensor 1. Other components than the first conductive member 10J and the first insulating member 40J have the same shapes as those of the pressure sensitive sensor 1.

The first conductive member 10J is a member formed into a substantially circular columnar shape having an oval shape in the transverse sectional view. The first conductive member 10J is formed so that the oval shape is rotated towards a longitudinal direction of the first conductive member 10J.

The first conductive member 10J has a concave groove 12J in the peripheral surface thereof to arrange the first insulating member 40J. More specifically, the groove 12J is formed at a position where a minor axis of the oval shape and the peripheral surface of the oval shape intersect.

The first insulating member 40J is a member formed into a cylindrical shape. The first insulating member 40J is spirally arranged along the groove 12J of the first conductive member 10J. In the transverse sectional view, the first insulating member 40J has a shape having an outer peripheral surface 41J and an inner peripheral surface 42J. The diameter of the first insulating member 40J is larger than a maximum value of an interval in the radial direction from the first conductive member 10J to the second conductive member 20.

The first insulating member 40J is fusion-bonded with the first conductive member 10J at the groove 12J. A portion of the first insulating member 40J in contact with the inner peripheral surface of the second conductive member 20 is not fusion-bonded with the second conductive member 20.

Since the cross-sectional shape of the first conductive member 10J has an oval shape, it is easy to shorten the shortest distance between the first conductive member 10J and the inner peripheral surface of the second conductive member 20. Specifically, it is easy to shorten a distance from an intersection between the peripheral surface of the first conductive member 10J and a major axis of the oval shape to the inner peripheral surface of the second conductive member 20 in comparison with a case where the first conductive member 10J is formed into a circular shape. Thus, the first conductive member 10J and the second conductive member 20 are easily brought into contact with each other.

Second Embodiment

Hereinafter, a pressure sensitive sensor according to a second embodiment of the present invention will be described with reference to FIG. 9 to FIG. 13B. The basic structure of the pressure sensitive sensor of the present embodiment is similar to that of the first embodiment; however, the number of the first insulating members is different from the first embodiment. Thus, in this embodiment, components associated with the first insulating member will be described with reference to FIG. 9 to FIG. 13B, and explanations of the same components will be omitted.

Figure 9:
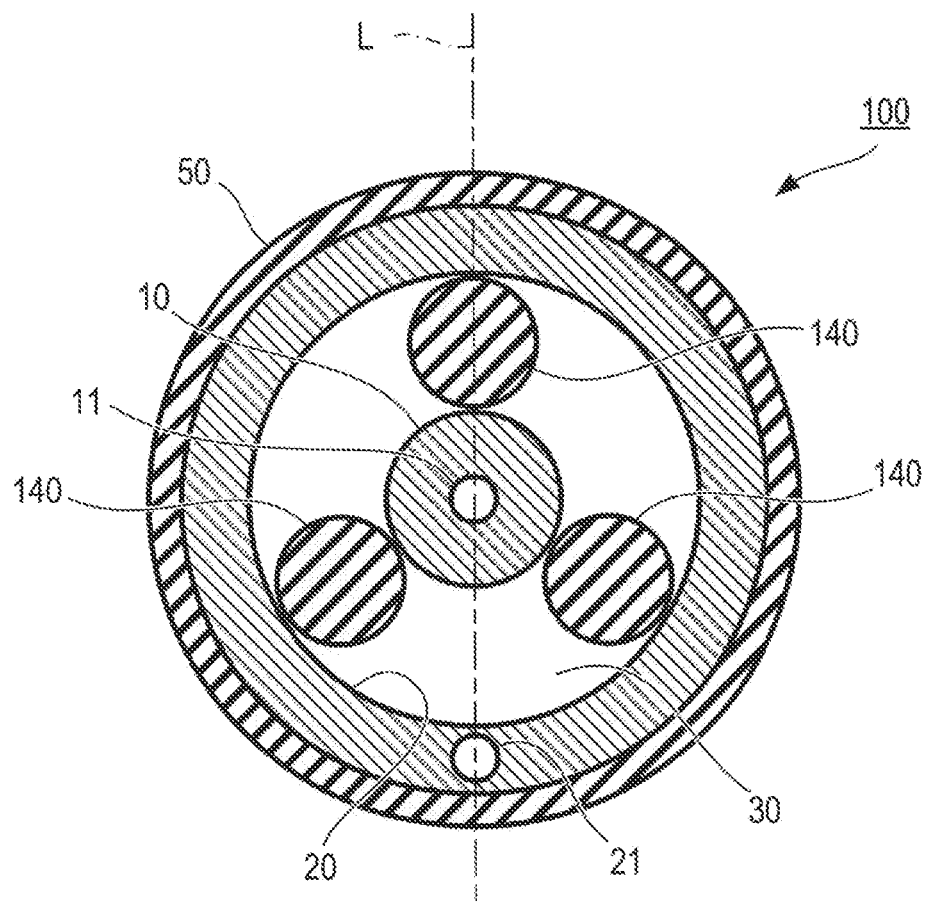
FIG. 9 is a transverse sectional view showing a configuration of a pressure sensitive sensor according to a second embodiment of the present invention.

A pressure sensitive sensor 100 of the present embodiment includes, as shown in FIG. 9, the first conductive member 10, the second conductive member 20, first insulating members (corresponding to insulating members) 140, and the second insulating member 50 as main components.

The first insulating members 140 are circular columnar members arranged together with the first conductive member 10 in the space 30 of the second conductive member 20. The first insulating members 140 each have a diameter equal to the interval in the radial direction from the first conductive member 10 to the second conductive member 20.

In this embodiment, three first insulating members 140 are arranged in the space 30. In this embodiment, a description will be made of an example in which the three first insulating members 140 are arranged at equal intervals in a circumferential direction around the first conductive member 10.

The first insulating members 140 may be arranged at equal intervals or may be arranged at unequal intervals. More specifically, the intervals are not limited as long as one first insulating member 140 is arranged on a virtual straight line L passing through the center of the first conductive member 10. The number of the arranged first insulating members 140 may be three, or may be more than three.

In this embodiment, a description will be made of an example in which the second conductor 21 is arranged between the first insulating members 140 arranged next to each other in the circumferential direction. For example, a description will be made of an example in which the second conductor 21 is arranged in the middle of the adjacent first insulating members 140. The second conductor 21 may be arranged in the middle of the adjacent first insulating members 140 or may be arranged in a position closer to either one of the first insulating members 140.

In this embodiment, a description will be made of an example in which the first insulating members 140 are spirally arranged along the peripheral surface that is the surface of the first conductive member 10. The first insulating members 140 may be arranged to linearly extend along a longitudinal direction of the first conductive member 10.

The amount of movement (also referred to as "spiral pitch") of the first insulating member 140 in the longitudinal direction produced while it goes around the first conductive member 10 one time can be appropriately set and is not particularly limited. Examples of a material forming the first insulating member 140 may include a rubber material, such as the polyolefin, having an insulating property.

In this embodiment, a portion of the first insulating member 140 in contact with the first conductive member 10 is fusion-bonded with the first conductive member 10. In other words, the first insulating members 140 are fixed to the first conductive member 10. On the other hand, a portion of the first insulating member 140 in contact with the second conductive member 20 is not fusion-bonded with the second conductive member 20. In other words, the first insulating members 140 are movable relative to the second conductive member 20.

In this embodiment, a description has been made of an example in which the first insulating members 140 and the first conductive member 10 are fusion-bonded, and the first insulating members 140 and the second conductive member 20 are not fusion-bonded; alternatively, a configuration may be adopted in which the first insulating members 140 and the first conductive member 10 are not fusion-bonded, and the first insulating members 140 and the second conductive member 20 are fusion-bonded. Furthermore, a configuration may be adopted in which the first insulating members 140 and the first conductive member 10 are not fusion-bonded and the first insulating members 140 and the second conductive member 20 are not fusion bonded.

In the pressure sensitive sensor 100 having the above-described configuration, a conductive state and an action when the pressure sensitive sensor 100 is bent are similar to those of the pressure sensitive sensor 1 of the first embodiment; and thus, such explanations are omitted.

With the pressure sensitive sensor 100 having the above-described configuration, the first conductive member 10 can be held and separated from the second conductive member 20 by the three first insulating members 140. In comparison with the case of having one first insulating member 140, the first conductive member 10 can be easily held and separated from the second conductive member 20.

Since one first insulating member 140 is arranged on the virtual straight line L across the first conductive member 10, the second conductive member 20 can be easily deformed when an external force is applied in a direction of the virtual straight line L in comparison with a case where two first insulating members 140 are arranged. That is, the second conductive member 20 and the first conductive member 10 easily come in contact with each other. Also, the pressure sensitive sensor 100 can be easily bent in the direction of the virtual straight line L.

The pressure sensitive sensor 100 is not limited to the shape described in the above embodiment, but may have other shapes. For example, the pressure sensitive sensor 100 may have various shapes as described below.

Figure 10A:
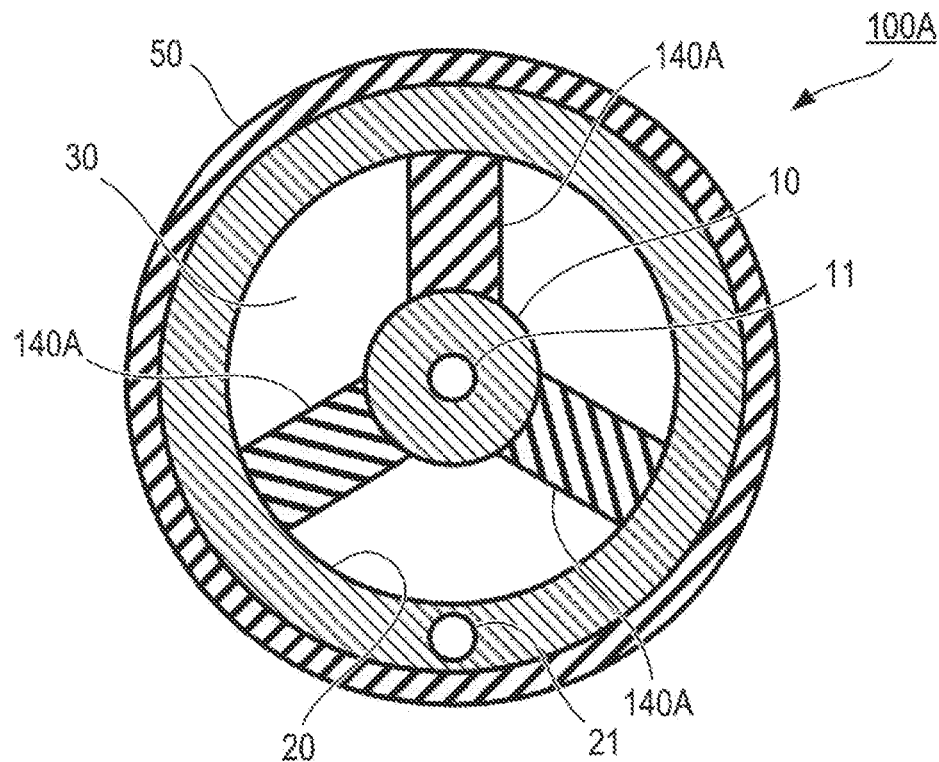
FIG. 10A is a transverse sectional view showing a configuration of a first variation of the pressure sensitive sensor of FIG. 9.

FIG. 10A is a transverse sectional view showing a configuration of a pressure sensitive sensor 100A. In the pressure sensitive sensor 100A, shapes of first insulating members 140A are different compared to the pressure sensitive sensor 100. Other components than the first insulating members 140A have the same shapes as those of the pressure sensitive sensor 100.

Three first insulating members 140A are members each formed into a rectangular columnar shape like the first insulating member 40A. The three first insulating members 140A are spirally arranged along the circumferential surface of the first conductive member 10. The three first insulating members 140A may be arranged to linearly extend along the longitudinal direction of the first conductive member 10.

As in the case of the first insulating members 140, the three first insulating members 140A may be arranged at equal intervals in the circumferential direction around the first conductive member 10 or may be arranged at unequal intervals. The number of the arranged first insulating members 140A may be three, or may be more than three.

The surface of the first insulating member 140A in contact with the first conductive member 10 has a concavely curved shape along the peripheral surface of the first conductive member 10, and is fusion-bonded with the first conductive member 10. The surface of the first insulating member 140A in contact with the second conductive member 20 has a convexly curved shape along the inner peripheral surface of the second conductive member 20, and is not fusion-bonded with the second conductive member 20. In other words, the first insulating members 140A are movable relative to the second conductive member 20.

In this embodiment, a description has been made of an example in which the first insulating members 140A and the first conductive member 10 are fusion-bonded, and the first insulating members 140A and the second conductive member 20 are not fusion-bonded; alternatively, a configuration may be adopted in which the first insulating members 140A and the first conductive member 10 are not fusion-bonded, and the first insulating members 140A and the second conductive member 20 are fusion-bonded. Furthermore, a configuration may be adopted in which the first insulating members 140A and the first conductive member 10 are not fusion-bonded and the first insulating members 140A and the second conductive member 20 are not fusion-bonded.

Figure 10B:
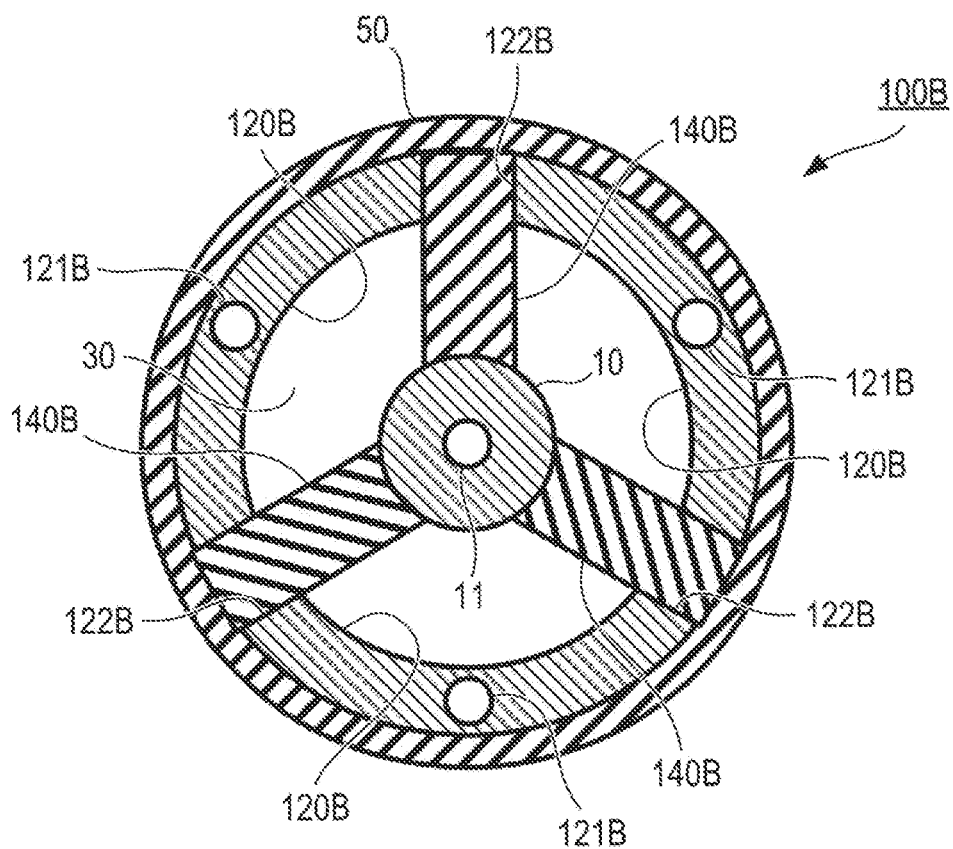
FIG. 10B is a transverse sectional view showing a configuration of a second variation of the pressure sensitive sensor of FIG. 9.

FIG. 10B is a transverse sectional view showing a configuration of a pressure sensitive sensor 100B. In the pressure sensitive sensor 100B, shapes of a second conductive member 120B and first insulating members 140B are different compared to the pressure sensitive sensor 100. Other components than the second conductive member 120B and the first insulating members 140B have the same shapes as those of the pressure sensitive sensor 100.

The second conductive member 120B is a cylindrical member having an internal space 30, in which the first conductive member 10 and the first insulating members 140B are arranged. The second conductive member 120B has three slits 122B, in which ends of the first insulating members 140B are arranged.

The three slits 122B are groove-shaped cutouts formed in the second conductive member 120B and spirally extend in the longitudinal direction along a circumferential surface of the second conductive member 120B. The three slits 122B are arranged next to each other at equal intervals in the circumferential direction of the second conductive member 120B or may be arranged at unequal intervals.

The second conductive member 120B is divided into three portions by the three slits 122B, and each of the three divided portions of the second conductive member 120B has a second conductor 121B arranged therein. The three second conductors 121B are wire rods formed of a metallic material having conductivity.

The three first insulating members 140B are members each formed into a rectangular columnar shape like the first insulating member 140A. The three first insulating members 140B are spirally arranged along the circumferential surface of the first conductive member 10. The ends of the first insulating members 140B on a second conductive member 120B side pass through the insides of the slits 122B and are in contact with the inner peripheral surface of the second insulating member 50.

The first insulating members 140B are not fusion-bonded with the second conductive member 120B and the second insulating member 50. In other words, the first insulating members 140B are movable relative to the second conductive member 120B and the second insulating member 50.

In this embodiment, a description has been made of an example in which the slits 122B and the first insulating members 140B spirally extend; alternatively, the slits 122B and the first insulating members 140B may linearly extend. Each of the number of the slits 122B and the number of the first insulating members 140B may be three, or may be more than three.

Figure 11A:
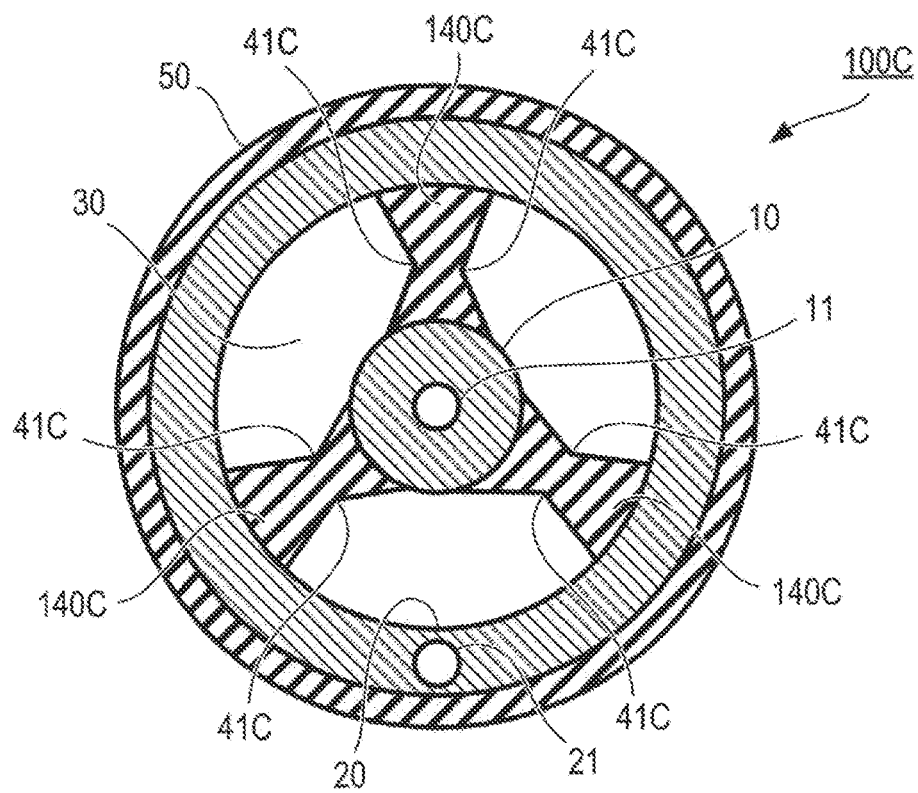
FIG. 11A is a transverse sectional view showing a configuration of a third variation of the pressure sensitive sensor of FIG. 9.

FIG. 11A is a transverse sectional view showing a configuration of a pressure sensitive sensor 100C. In the pressure sensitive sensor 100C, shapes of first insulating members 140C are different compared to the pressure sensitive sensor 100. Other components than the first insulating members 140C have the same shapes as those of the pressure sensitive sensor 100.

The three first insulating members 140C are spirally arranged along the circumferential surface of the first conductive member 10. In the transverse sectional view, the first insulating members 140C each have a shape extending in the radial direction from the first conductive member 10 towards the second conductive member 20, and each have a shape with recesses 41C.

The surface of the first insulating member 140C in contact with the first conductive member 10 has a concavely curved shape along the peripheral surface of the first conductive member 10, and is fusion-bonded with the first conductive member 10. The surface of the first insulating member 140C in contact with the second conductive member 20 has a convexly curved shape along the inner peripheral surface of the second conductive member 20, and is not fusion-bonded with the second conductive member 20. In other words, the first insulating members 140C are movable relative to the second conductive member 20.

The recess 41C is provided in each of a pair of surfaces of the first insulating member 140C extending between the first conductive member 10 and the second conductive member 20. In this embodiment, a description will be made of an example in which the recesses 41C are grooves each having a substantially V-shape formed in the first insulating members 140C.

With the pair of recesses 41C, the first insulating member 140C can have a part narrow in width and can easily buckle (or bend) in comparison with the case where the recesses 41C are not provided.

In this embodiment, a description has been made of an example in which the pair of recesses 41C is provided; alternatively, only one recess 41C may be provided. The shape of the recess 41C may be a V-shape or may be any other shape, such as a U-shape, which allows the first insulating member 140C to easily buckle.

In this embodiment, a description has been made of an example in which the first insulating members 140C spirally extend; alternatively, the first insulating members 140C may linearly extend. The number of the arranged first insulating members 140C may be three, or may be more than three.

Figure 11B:
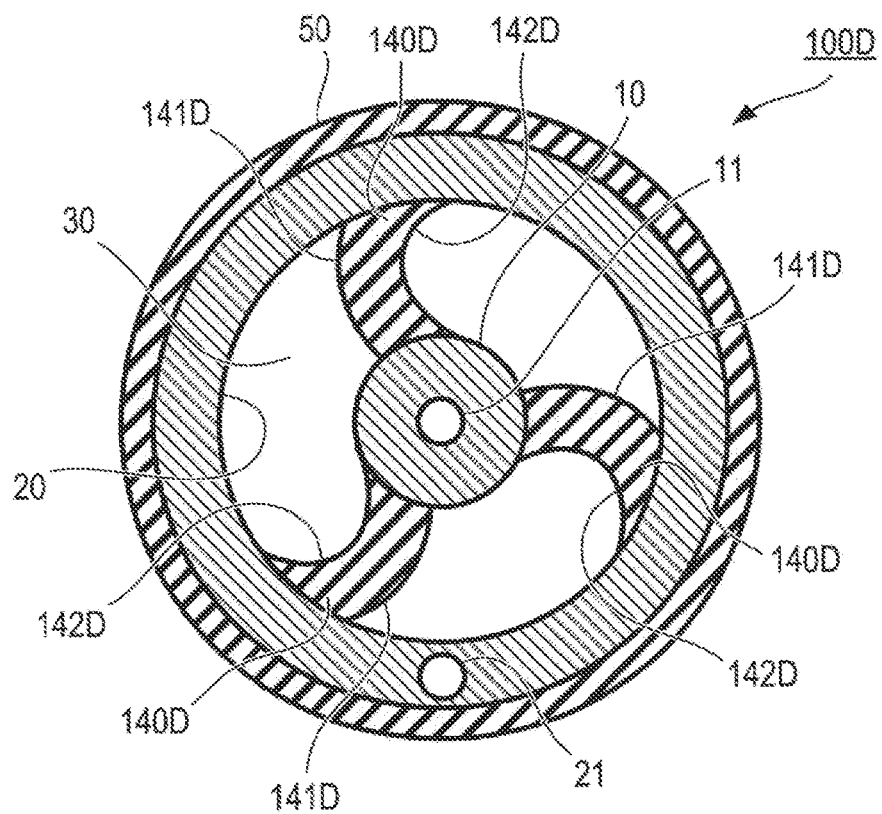
FIG. 11B is a transverse sectional view describing a configuration of the fourth variation of the pressure sensitive sensor of FIG. 9.

FIG. 11B is a transverse sectional view showing a configuration of a pressure sensitive sensor 100D. In the pressure sensitive sensor 100D, shapes of first insulating members 140D are different compared to the pressure sensitive sensor 100. Other components than the first insulating members 140D have the same shapes as those of the pressure sensitive sensor 100.

The three first insulating members 140D are spirally arranged along the circumferential surface of the first conductive member 10. The first insulating members 140D each have a curved rectangular shape extending in the radial direction from the first conductive member 10 towards the second conductive member 20 in the transverse sectional view.

The surface of the first insulating member 140D in contact with the first conductive member 10 has a concavely curved shape along the peripheral surface of the first conductive member 10, and is fusion-bonded with the first conductive member 10. The surface of the first insulating member 140D in contact with the second conductive member 20 has a convexly curved shape along the inner peripheral surface of the second conductive member 20, and is not fusion-bonded with the second conductive member 20. In other words, the first insulating members 140D are movable relative to the second conductive member 20.

In the first insulating member 140D, one surface 141D of a pair of surfaces extending between the first conductive member 10 and the second conductive member 20 has a convexly curved shape. The other surface 142D of the pair of surfaces has a concavely curved shape.

In this embodiment, a description has been made of an example in which the first insulating member 140D has a shape convexly curved in the counterclockwise direction in FIG. 11B; alternatively, the first insulating member 140D may have a shape convexly curved in the clockwise direction.

In this embodiment, a description has been made of an example in which the first insulating members 140D spirally extend; alternatively, the first insulating members 140D may linearly extend. The number of the arranged first insulating members 140D may be three, or may be more than three.

Figure 12A:
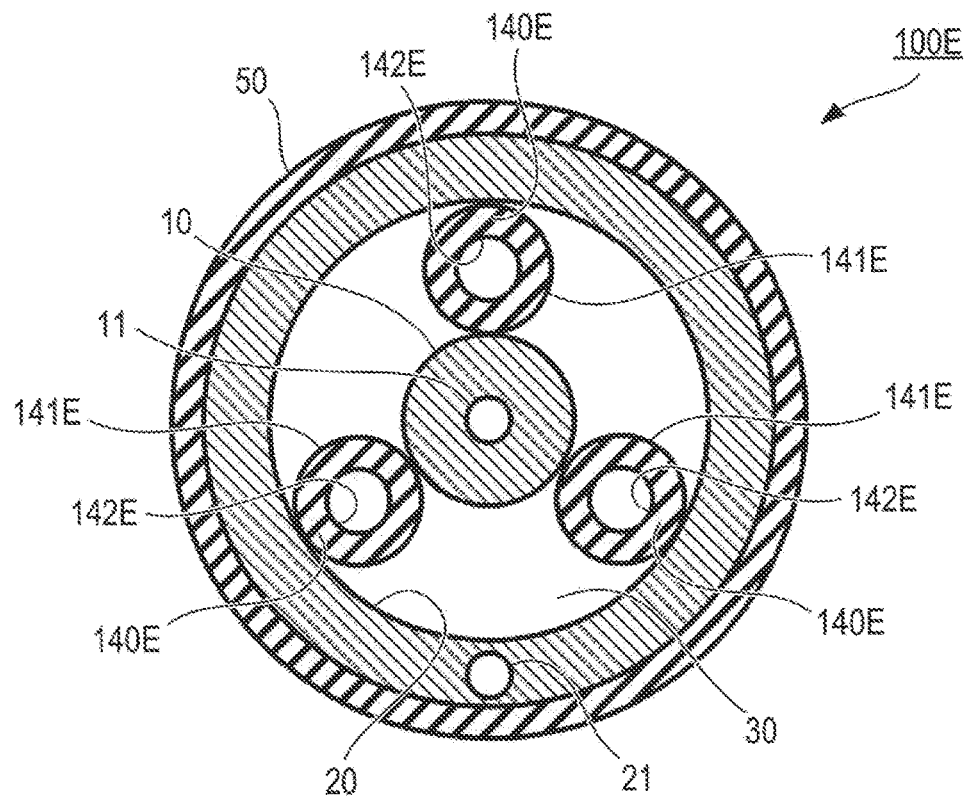
FIG. 12A is a transverse sectional view showing a configuration of a fifth variation of the pressure sensitive sensor of FIG. 9.

FIG. 12A is a transverse sectional view showing a configuration of a pressure sensitive sensor 100E. In the pressure sensitive sensor 100E, shapes of first insulating members 140E are different compared to the pressure sensitive sensor 100. Other components than the first insulating members 140E have the same shapes as those of the pressure sensitive sensor 100.

The three first insulating members 140E are members each formed into a cylindrical shape. The first insulating members 140E are spirally arranged along the circumferential surface of the first conductive member 10. In the transverse sectional view, the first insulating members 140E each have a shape having an outer peripheral surface 141E and an inner peripheral surface 142E. The outer peripheral surface 141E is in contact with the first conductive member 10 and the second conductive member 20.

A portion of the outer peripheral surface 141E of the first insulating member 140E in contact with the first conductive member 10 is fusion-bonded with the first conductive member 10. A portion of the outer peripheral surface 141E of the first insulating member 140E in contact with the second conductive member 20 is not fusion-bonded with the second conductive member 20. In other words, the first insulating members 140E are movable relative to the second conductive member 20.

In this embodiment, a description has been made of an example in which the first insulating members 140E spirally extend; alternatively, the first insulating members 140E may linearly extend. The number of the arranged first insulating members 140E may be three, or may be more than three.

Figure 12B:
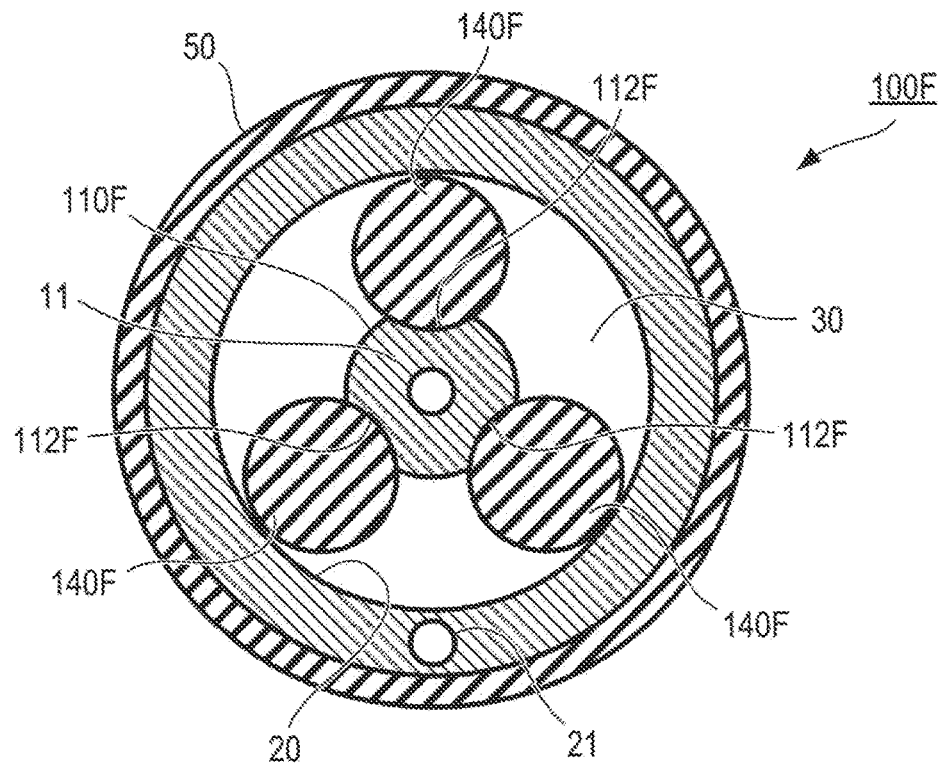
FIG. 12B is a transverse sectional view showing a configuration of a sixth variation of the pressure sensitive sensor of FIG. 9.

FIG. 12B is a transverse sectional view showing a configuration of a pressure sensitive sensor 100F. In the pressure sensitive sensor 100F, shapes of a first conductive member 110F and first insulating members 140F are different compared to the pressure sensitive sensor 100. Other components than the first conductive member 110F and the first insulating members 140F have the same shapes as those of the pressure sensitive sensor 100.

The first conductive member 110F is a member formed into a substantially circular columnar shape. The first conductive member 110F has three concave grooves 112F in the peripheral surface thereof to arrange the first insulating members 140F. The grooves 112F are formed to spirally extend in a longitudinal direction of the first conductive member 110F.

The first insulating members 140F are members each formed into a circular columnar shape. The first insulating members 140F are spirally arranged along the grooves 112F of the first conductive member 110F. In the transverse sectional view, the diameter of the first insulating member 140F is larger than the interval in the radial direction from the first conductive member 110F to the second conductive member 20.

The first insulating members 140F are fusion-bonded with the first conductive member 110F at the grooves 112F. A portion of the first insulating member 140F in contact with the inner peripheral surface of the second conductive member 20 is not fusion-bonded with the second conductive member 20. In other words, the first insulating members 140F are movable relative to the second conductive member 20.

In this embodiment, a description has been made of an example in which the first insulating members 140F and the grooves 112F spirally extend; alternatively, the first insulating members 140F and the grooves 112F may linearly extend. Each of the number of the first insulating members 140F and the number of the grooves 112F may be three, or may be more than three.

Figure 13A:
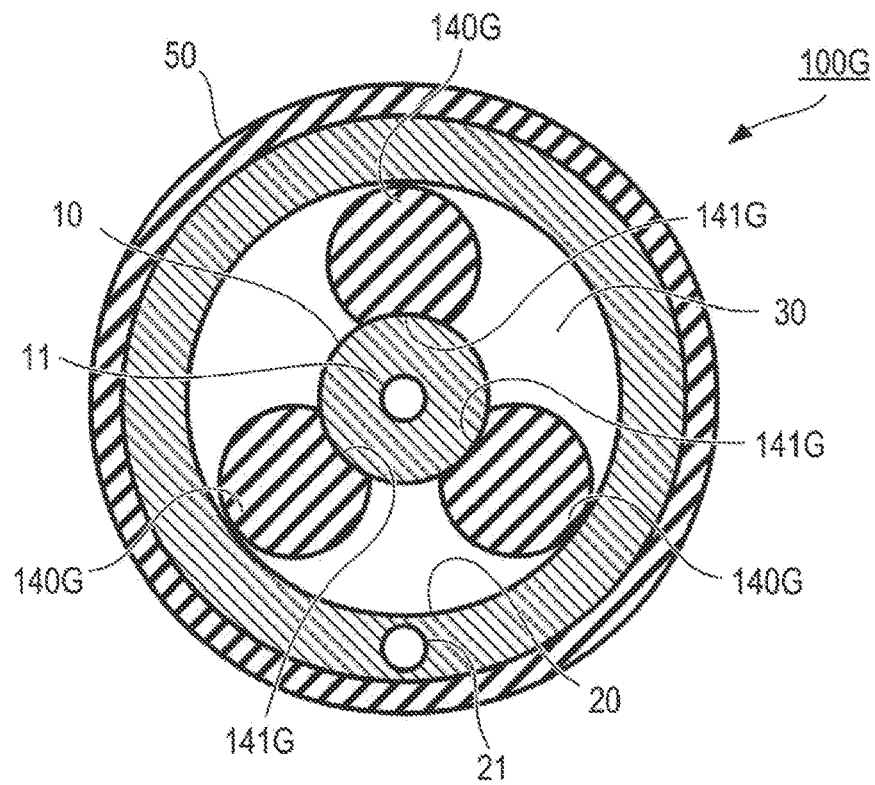
FIG. 13A is a transverse sectional view showing a configuration of a seventh variation of the pressure sensitive sensor of FIG. 9.

FIG. 13A is a transverse sectional view showing a configuration of a pressure sensitive sensor 100G. In the pressure sensitive sensor 100G, shapes of first insulating members 140G are different compared to the pressure sensitive sensor 100. Other components than the first insulating members 140G have the same shapes as those of the pressure sensitive sensor 100.

The three first insulating members 140G are members each formed into a substantially circular columnar shape. In the transverse sectional view, the diameter of the first insulating member 140G is larger than the interval in the radial direction from the first conductive member 10 to the second conductive member 20. The first insulating members 140G are spirally arranged along the circumferential surface of the first conductive member 10.

The first insulating members 140G each have a concave groove 141G in a circumferential surface thereof to arrange the first conductive member 10. The first insulating members 140G are fusion-bonded with the first conductive member 10 at the grooves 141G. A portion of the first insulating member 140G in contact with the inner peripheral surface of the second conductive member 20 is not fusion-bonded with the second conductive member 20. In other words, the first insulating members 140G are movable relative to the second conductive member 20.

In this embodiment, a description has been made of an example in which the first insulating members 140G spirally extend; alternatively, the first insulating members 140G may linearly extend. The number of the first insulating members 140G may be three, or may be more than three.

Figure 13B:
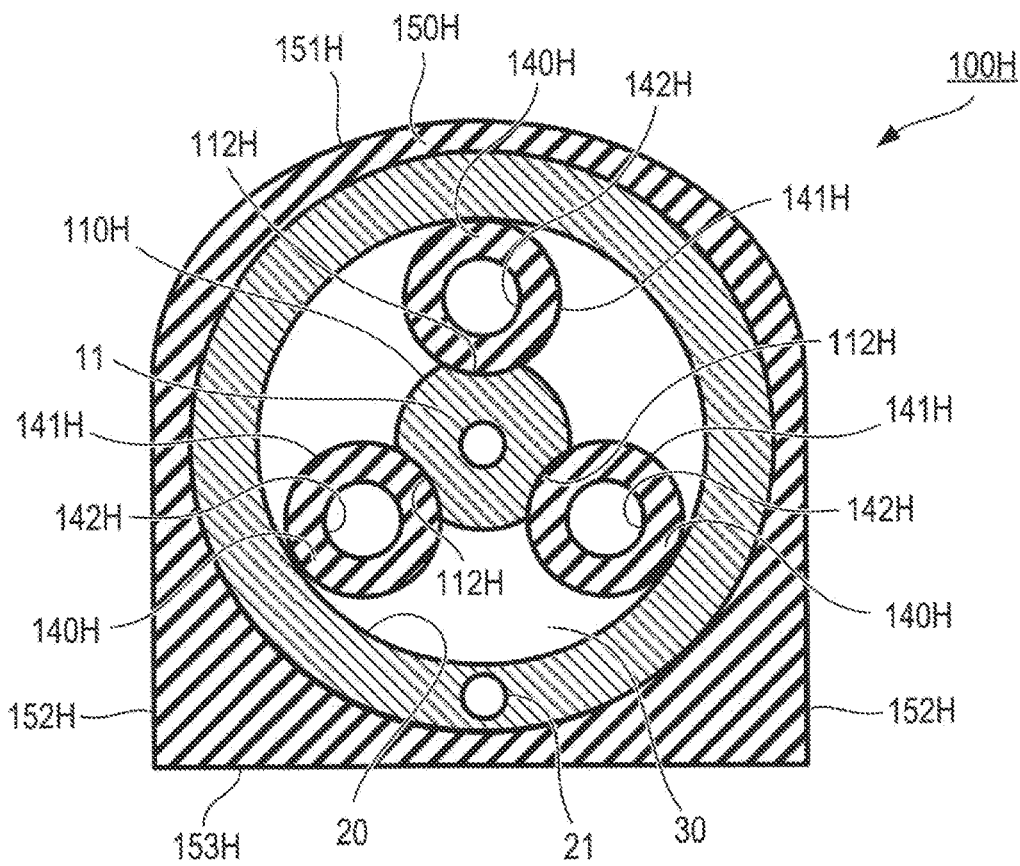
FIG. 13B is a transverse sectional view showing a configuration of an eighth variation of the pressure sensitive sensor of FIG. 9.

FIG. 13B is a transverse sectional view showing a configuration of a pressure sensitive sensor 100H. In the pressure sensitive sensor 100H, shapes of a first conductive member 110H, first insulating members 140H, and a second insulating member 150H are different compared to the pressure sensitive sensor 100. Other components than the first conductive member 110H, the first insulating members 140H, and the second insulating member 150H have the same shapes as those of the pressure sensitive sensor 100.

The first conductive member 110H is a member formed into a substantially circular columnar shape. The first conductive member 110H has concave grooves 112H in the peripheral surface thereof to arrange the first insulating members 140H. The grooves 112H are formed to spirally extend in a longitudinal direction of the first conductive member 110H.

The first insulating members 140H are members each formed into a cylindrical shape. The first insulating members 140H are spirally arranged along the grooves 112H of the first conductive member 110H. In the transverse sectional view, the first insulating members 140H each have a shape having an outer peripheral surface 141H and an inner peripheral surface 142H. The diameter of the first insulating member 140H is larger than the interval in the radial direction from the first conductive member 110H to the second conductive member 20.

The first insulating members 140H are fusion-bonded with the first conductive member 1101H at the grooves 112H. A portion of the first insulating member 140H in contact with the inner peripheral surface of the second conductive member 20 is not fusion-bonded with the second conductive member 20. In other words, the first insulating members 110H are movable relative to the second conductive member 20.

The second insulating member 150H is a cylindrical member that covers the outer peripheral surface of the second conductive member 20 and that forms the outer shape of the pressure sensitive sensor 100H. The second insulating member 150H has a D-shaped outer shape in the transverse sectional view.

Specifically, the second insulating member 150H has a curved surface 151H extending along the second conductive member 20, a pair of side surfaces 152H, 152H having planar shapes extending from both ends of the curved surface 151H, and an end surface 153H having a planar shape arranged between the pair of side surfaces 152H, 152H.

In this embodiment, a description has been made of an example in which the first insulating members 140H and the grooves 11211 spirally extend; alternatively, the first insulating members 140H and the grooves 112H may linearly extend. Each of the number of the first insulating members 140H and the number of the grooves 112H may be three, or may be more than three.

The technical scope of the present invention is not limited to the above-described embodiments and various modifications can be made within a range not deviating from a gist of the present invention.

For example, in the above-described embodiments, the pressure sensitive sensor has been described in an example in which the pressing force is detected based on the conductivity between the first conductive member and the second conductive member; alternatively, the pressing force may be detected based on a change of capacitance between the first conductive member and the second conductive member.

The present invention is not limited to the above-described embodiments, and may be applied to embodiments appropriately combined with any of these embodiments.

What is claimed is:

1. A pressure sensitive sensor comprising:
   a first conductive member formed into a shape having a longitudinal dimension larger than a transverse dimension, the first conductive member having conductivity and elasticity;
   a second conductive member internally including a space to arrange the first conductive member, the space having a longitudinal dimension larger than a transverse dimension, the second conductive member having conductivity and elasticity; and
   an insulating member having an insulating property and elasticity, the insulating member holding the first conductive member to separate the first conductive member from the second conductive member, the insulating member being arranged in the space inside the second conductive member in which the first conductive member is arranged, the insulating member being not fusion-bonded with the first conductive member, whereby the insulating member is movable relative to the first conductive member,
   wherein the insulating member includes a hollow part, and neither the first conductive member nor the second conductive member is exposed to the hollow part.

2. The pressure sensitive sensor according to claim 1, wherein the insulating member is formed into a shape having a longitudinal dimension larger than a transverse dimension, and
   wherein one insulating member is spirally arranged along a surface of the first conductive member.

3. The pressure sensitive sensor according to claim 1, wherein the insulating member is formed into a shape having a longitudinal dimension larger than a transverse dimension, and
   wherein multiple insulating members are arranged at intervals on a surface of the first conductive member.

4. The pressure sensitive sensor according to claim 3, wherein in a cross sectional view intersecting a longitudinal direction of the first conductive member, one insulating member is arranged on a virtual straight line passing through a center of the first conductive member.

5. A pressure sensitive sensor comprising:

a first conductive member formed into a shape having a longitudinal dimension larger than a transverse dimension, the first conductive member having conductivity and elasticity;

a second conductive member internally including a space to arrange the first conductive member, the space having a longitudinal dimension larger than a transverse dimension, the second conductive member having conductivity and elasticity; and an insulating member having an insulating property and elasticity, the insulating member holding the first conductive member to separate the first conductive member from the second conductive member, the insulating member being arranged in the space inside the second conductive member in which the first conductive member is arranged, the insulating member being fusion-bonded with none of the first conductive member and the second conductive member, whereby the insulating member is movable relative to both of the first conductive member and the second conductive member, wherein the insulating member includes a hollow part, and neither the first conductive member nor the second conductive member is exposed to the hollow part.

6. The pressure sensitive sensor according to claim 5, wherein the insulating member is formed into a shape having a longitudinal dimension larger than a transverse dimension, and wherein one insulating member is spirally arranged along a surface of the first conductive member.

7. The pressure sensitive sensor according to claim 5, wherein the insulating member is formed into a shape having a longitudinal dimension larger than a transverse dimension, and wherein multiple insulating members are arranged at intervals on a surface of the first conductive member.

8. The pressure sensitive sensor according to claim 7, wherein in a cross sectional view intersecting a longitudinal direction of the first conductive member, one insulating member is arranged on a virtual straight line passing through a center of the first conductive member.

* * * * *